(12) United States Patent
Hase et al.

(10) Patent No.: US 8,744,653 B2
(45) Date of Patent: Jun. 3, 2014

(54) CONTROL APPARATUS

(75) Inventors: Shigekazu Hase, Nishio (JP); Hiroya Ueno, Wolfsburg (DE); Kohei Tsuda, Anjo (JP); Eiji Moriyama, Okazaki (JP); Hiroshi Tsutsui, Nishio (JP)

(73) Assignee: Aisin AW Co., Ltd., Anjo (JP)

( * ) Notice: Subject to any disclaimer, the term of this patent is extended or adjusted under 35 U.S.C. 154(b) by 543 days.

(21) Appl. No.: 12/654,746

(22) Filed: Dec. 30, 2009

(65) Prior Publication Data

US 2010/0174429 A1   Jul. 8, 2010

(30) Foreign Application Priority Data

Jan. 8, 2009   (JP) .................................. 2009-002489

(51) Int. Cl.
 *B60L 9/00* (2006.01)

(52) U.S. Cl.
USPC ................ 701/22; 477/64; 477/70; 477/154; 477/174; 477/3; 701/51; 701/53; 701/54; 701/59; 701/70

(58) Field of Classification Search
USPC ........ 701/51, 55, 64, 69, 61, 53; 477/70, 124, 477/107, 3, 120, 71, 74, 150, 114, 115, 477/143; 192/201, 106 R
See application file for complete search history.

(56) References Cited

U.S. PATENT DOCUMENTS

| | | | |
|---|---|---|---|
| 6,128,565 A | | 10/2000 | Tsutsui et al. |
| 6,128,656 A * | | 10/2000 | Matchefts et al. ............ 709/223 |
| 6,577,940 B2 * | | 6/2003 | Saito et al. ...................... 701/59 |
| 7,100,720 B2 | | 9/2006 | Ishikawa |
| 2002/0061803 A1 * | | 5/2002 | Aoki ................................. 477/3 |
| 2005/0029023 A1 * | | 2/2005 | Takami et al. ............... 180/65.3 |
| 2008/0318727 A1 * | | 12/2008 | Matsubara et al. ............... 477/3 |
| 2011/0239804 A1 * | | 10/2011 | Hase et al. ................. 74/473.11 |

FOREIGN PATENT DOCUMENTS

| | | |
|---|---|---|
| EP | 1 916 452 A1 | 4/2008 |
| JP | A 6-331013 | 11/1994 |
| JP | A 11-82712 | 3/1999 |
| JP | A-2000-152407 | 5/2000 |
| JP | A-2002-130453 | 5/2002 |
| JP | A 2004-203219 | 7/2004 |
| JP | A 2007-92812 | 4/2007 |
| JP | A-2007-191018 | 8/2007 |
| JP | A-2008-94332 | 4/2008 |

OTHER PUBLICATIONS

International Search Report mailed Mar. 30, 2010 for PCT/JP2009/071642.
Apr. 17, 2012 Extended European Search Report issued in European Patent Application No. 09 83 7599.1.
Aug. 30, 2012 Office Action issued in U.S. Appl. No. 12/591,891.

* cited by examiner

*Primary Examiner* — Helal A Algahaim
*Assistant Examiner* — Jelani Smith
(74) *Attorney, Agent, or Firm* — Oliff PLC

(57) ABSTRACT

A control apparatus for controlling a transmission apparatus that includes: an input member that is drivably connected to a rotating electrical machine being capable of generating regenerative torque based on an engine and a deceleration request of a vehicle; an output member that is drivably connected to wheels; and a speed change mechanism that has a plurality of friction engagement elements that are controlled to be engaged and released so as to switch a plurality of shift speeds, and that shifts a rotation speed of the input member at one of gear ratios set for the shift speeds and outputs the shifted speed to the output member.

20 Claims, 13 Drawing Sheets

CONTROL APPARATUS

INCORPORATION BY REFERENCE

The disclosure of Japanese Patent Application No. 2009-002489 filed on Jan. 8, 2009 including the specification, drawings and abstract is incorporated herein by reference in its entirety.

BACKGROUND

The present invention relates to a control apparatus for controlling a transmission apparatus that includes: an input member drivably connected to an engine and a rotating electrical machine; an output member drivably connected to wheels; and a speed change mechanism that has a plurality of friction engagement elements that are controlled to be engaged and released so as to switch a plurality of shift speeds, and that shifts the rotation speed of the input member at a gear ratio of each shift speed so as to output the shifted speed to the output member.

As a vehicular driving apparatus provided with a transmission apparatus that includes an input member drivably connected to an engine, an output member drivably connected to the wheels, and a speed change mechanism that has a plurality of friction engagement elements that are controlled to be engaged and released so as to switch a plurality of shift speeds, and that shifts the rotation speed of the input member at a gear ratio of each shift speed so as to output the shifted speed to the output member, the apparatus described in Japanese Patent Application Publication No. JP-A-2002-130453 is known. In such a driving apparatus, generally, when switching between two shift speeds adjacent to each other is performed in a transmission apparatus, engagement and release of the friction engagement elements are controlled so as to carry out a so-called clutch-to-clutch shifting. In the so-called clutch-to-clutch shifting, normally, a friction engagement element to be released is relatively swiftly released fully at an initial stage in the shifting operation, and a friction engagement element to be engaged is gradually engaged while slipping in a semi-engaged state. As a matter of course, this holds true when switching to a shift speed with a smaller gear ratio (an upshift) is carried out in a state where an accelerator pedal position of a vehicle is equal to or smaller than a prescribed value.

In this connection, the transmission apparatus of Japanese Patent Application Publication No. JP-A-2002-130453 is structured such that, when an upshift is carried out in a situation where the accelerator pedal position of the vehicle is equal to or smaller than a prescribed value, a control apparatus exerts release-side friction engagement element control so as to switch a pressure of hydraulic oil on a release-side element, which is a friction engagement element to be released at shift speed switching, between a release ensuring pressure under which the release-side element is brought into a state immediately before engagement and an engagement ensuring pressure under which the release-side element slightly engages. By exerting the release-side friction engagement element control, a downshift operation can immediately be started in response to a determination to downshift (to switch to a shift speed with a greater gear ratio) when upshifting in a situation where an accelerator pedal position of the vehicle is equal to or smaller than a prescribed value. Under the release-side friction engagement element control of Japanese Patent Application Publication No. JP-A-2002-130453, the pressure of hydraulic oil on the release-side element is increased and reduced relative to a stroke end pressure of the release-side element with a prescribed pressure width ($\Delta P2$), thereby being switched between the release ensuring pressure and the engagement ensuring pressure. Under the release-side friction engagement element control, at shift speed switching, the release-side element alternates between a semi-engaged slipping state and a fully released state.

On the other hand, as one exemplary vehicular driving apparatus in which both an engine and a rotating electrical machine are employed as driving force sources for use in a hybrid vehicle, an apparatus described in Japanese Patent Application Publication No. JP-A-2008-094332 is known, for example.

In such a driving apparatus for a hybrid vehicle also, in some cases, the transmission apparatus carries out an upshift in a state where the accelerator pedal position is equal to or smaller than a prescribed value. In such a case also, the so-called clutch-to-clutch shifting is generally carried out and, accordingly, the release-side element is relatively swiftly released fully at an initial stage in the shifting operation, while the friction engagement element to be engaged is gradually engaged while slipping in the semi-engaged state. Here, the rotating electrical machine is structured to be capable of generating regenerative torque based on a deceleration request of the vehicle.

Meanwhile, as for a common vehicle having an engine as a sole driving force source, a hybrid vehicle in a situation where its rotating electrical machine does not produce regenerative torque, and the like, the negative torque affecting the input member is small in a situation where the accelerator pedal position is equal to or smaller than a prescribed value. Accordingly, in such cases, even when the general shifting control that involves the so-called clutch-to-clutch shifting is exerted, the rotation speed of the input member is only reduced by frictional forces attributed to the components of the engine and the like, and the variation in the rotational speed is moderate. Therefore, the occurrence of shift shock in engaging the to-be-engaged element poses little problem. However, in a situation where the transmission apparatus included in the driving apparatus for a hybrid vehicle of Japanese Patent Application Publication No. JP-A-2008-094332 upshifts while the accelerator pedal position is equal to or smaller than a prescribed value, the rotating electrical machine carries out regenerative braking in some cases if the brake is intentionally operated by the driver of the vehicle. In such a case, if the common clutch-to-clutch shifting is carried out, the relatively great negative torque (regenerative torque) output from the rotating electrical machine greatly reduces the rotation speed of the input member, i.e., invites a rapid variation, and thus the shift shock highly possibly occurs. Addressing this problem, the vehicular driving apparatus described in Japanese Patent Application Publication No. JP-A-2008-094332 is structured such that, when the rotating electrical machine regenerates, the magnitude of the negative torque output from the rotating electrical machine is limited to be equal to or smaller than a certain magnitude. This avoids a rapid reduction in the rotation speed of the input member drivably connected to the rotating electrical machine, thereby suppressing the occurrence of the shift shock in the vehicle.

SUMMARY

However, when the transmission apparatus of the driving apparatus for a hybrid vehicle including an engine and a rotating electrical machine as driving force sources is structured to limit the magnitude of the regenerative torque as in Japanese Patent Application Publication No. JP-A-2008-094332, although the occurrence of the shift shock can be suppressed, this involves a commensurate reduction in energy to be regenerated. Thus, this structure poses the problem of the energy efficiency reduction. It is not impossible for the transmission apparatus of the driving apparatus for a hybrid vehicle to exert some oil pressure control such as the release-side friction engagement element control described in Japanese Patent Application Publication No. JP-A-2002-130453. However, with the measures just being taken to increase and reduce the pressure of hydraulic oil on the release-side element near the stroke end pressure of the piston of the release-side element such that the release-side element alternates between a slightly slipping state and a fully released state, it is inevitable that the effectiveness in increasing the regenerative energy is low.

Accordingly, it is desired to develop the technology that can achieve, in a situation where switching to a shift speed with a smaller gear ratio is carried out when the accelerator pedal position of the vehicle is equal to or smaller than a prescribed value, both the suppression of the occurrence of the shift shock associated with the shifting operation and an improvement in the energy efficiency.

In order to achieve the object of the present invention described above, a control apparatus for controlling a transmission apparatus according to a first aspect of the present invention, in which the transmission apparatus includes: an input member that is drivably connected to a rotating electrical machine being capable of generating regenerative torque based on an engine and a deceleration request of a vehicle; an output member that is drivably connected to wheels; and a speed change mechanism that has a plurality of friction engagement elements that are controlled to be engaged and released to switch a plurality of shift speeds, and that shifts a rotation speed of the input member at one of gear ratios set for the shift speeds and outputs the shifted speed to the output member, has a characteristic structure in which, when the speed change mechanism switches one of the shift speeds to another one of the shift speeds with smaller one of the gear ratios in an accelerator pedal light depression position state where an accelerator pedal position of the vehicle is equal to or smaller than a prescribed value, the control apparatus reduces a release-side oil pressure, which is a pressure of hydraulic oil on a release-side element that serves as the friction engagement element to be released among the friction engagement elements to cause the release-side element to slip, and keeps the release-side element in such a slipping state for an entire shifting phase that begins at a time point when the release-side element starts to slip and that ends at another time point when a rotation speed, which is obtained by multiplying a rotation speed of the output member by the gear ratio after the switching of the shift speeds, and the rotation speed of the input member synchronize with each other.

In the present application, the "slipping state" refers to a semi-engaged state between a fully engaged state and a fully released state. More specifically, the "slipping state" refers to a state where transfer of the driving force is carried out between an input side rotary member and an output side rotary member while the engagement members on the opposite sides of the relevant friction engagement element have a prescribed rotation speed difference.

The "rotating electrical machine" as used herein is a term that includes a motor (electric motor), a generator (electric power generator), and a motor/generator that functions as both the motor and the generator as necessary.

With the characteristic structure described above, when the shift speed is switched to the shift speed with smaller gear ratio in a state where the accelerator pedal position of the vehicle is equal to or smaller than a prescribed value, the release-side oil pressure is reduced so as to keep the release-side element in the slipping state for the entire shifting phase. This in turn retains a state, for the entire shifting phase, where part of the rotational driving force from the output member is transferred via the release-side element to the input member side. Accordingly, even when the rotating electrical machine is caused to produce relatively great negative torque in order to carry out regenerative braking during the shifting operation, the rotational driving force transferred from the output member suppresses a rapid variation in the rotation speed of the input member. Hence, the occurrence of the shift shock can be suppressed. Further, owing to the fact that the control exerted over the release-side oil pressure can solely suppress the occurrence of the shift shock as described above, it is not necessary to limit the magnitude of the negative torque (regenerative torque) output from the rotating electrical machine, in contrast to a case where the release-side element is fully released relatively swiftly at an initial stage in the shifting phase. Hence, without inviting any disadvantages such as a reduction in the energy to be regenerated, a high energy efficiency can be retained. Accordingly, with the characteristic structure described above, when the shift speed is switched to a shift speed with a smaller gear ratio in a state where an accelerator pedal position of the vehicle is equal to or smaller than a prescribed value, both the suppression of the occurrence of the shift shock and an improvement in the energy efficiency can be achieved.

A first limit oil pressure may be set to a value that is commensurate with magnitude of output torque from the rotating electrical machine, and that is equal to or greater than a stroke end pressure of a piston of the release-side element when the output torque from the rotating electrical machine is negative, and the release-side oil pressure may be kept at magnitude equal to or greater than the first limit oil pressure for the entire shifting phase.

With this structure, the release-side oil pressure is surely kept at a pressure equal to or greater than the stroke end pressure of the piston of the release-side element when the output torque from the rotating electrical machine is negative. This appropriately establishes the slipping state of the release-side element. In such a case, the release-side oil pressure is kept at a pressure commensurate with the magnitude of the output torque from the rotating electrical machine and, therefore, the slip amount of the release-side element can appropriately be adjusted so as to be commensurate with the magnitude of the output torque from the rotating electrical machine.

The first limit oil pressure may be set to a value that becomes greater as the output torque from the rotating electrical machine varies in a negative direction.

With this structure, the first limit oil pressure is increased as the negative torque (regenerative torque) output from the rotating electrical machine is greater so as to reduce the slip amount, thereby increasing the proportion of the rotational driving force transferred from the output member via the release-side element to the input member side. Hence, it becomes possible to ensure a great amount of energy to be regenerated. Further, the first limit oil pressure is reduced as the regenerative torque is smaller so as to increase the slip amount, thereby reducing the proportion of the rotational driving force transferred from the output member via the release-side element to the input member side. Hence, it becomes possible to suppress transfer of excessively great rotational driving force from the output member via the release-side element to the input member side.

A second limit oil pressure may be set to a value that is commensurate with the accelerator pedal position, and that is equal to or greater than the stroke end pressure of a piston of the release-side element in the accelerator pedal light depression position state, and the release-side oil pressure may be kept at magnitude equal to or greater than the second limit oil pressure for the entire shifting phase.

With this structure, in the accelerator pedal light depression position state, the release-side oil pressure is kept at a pressure at least equal to or greater than the stroke end pressure of the piston of the release-side element for the entire shifting phase and, therefore, the slipping state of the release-side element can appropriately be established independently of the output torque from the rotating electrical machine. Hence, in addition to the effect described above that can naturally be attained when the rotating electrical machine is actually producing negative torque, the effect can be appropriately achieved also in a situation where the rotating electrical machine is not actually producing negative torque at present, but is to produce the negative torque later. Hence, when the shift speed is switched to a shift speed with a smaller gear ratio in a state where the accelerator pedal position of the vehicle is equal to or smaller than a prescribed value, in both cases where the rotating electrical machine produces the negative torque from the initial stage in the shifting phase, and where the rotating electrical machine does not produce the negative torque at the initial stage in the shifting phase but starts to produce the negative torque in the course of the shifting phase, the suppression of the occurrence of the shift shock and the improvement in the energy efficiency can both be achieved.

A target rotation speed variation rate of the input member may be determined based on a preset target shifting time that represents a target required time for switching between the shift speeds, and a rotation speed variation width that represents a difference in the rotation speed of the input member before and after the switching of the shift speeds, and an engage-side oil pressure that is a pressure of the hydraulic oil on an engage-side element may be varied in synchronization with a reduction in the release-side oil pressure, such that an actual rotation speed variation rate of the input member follows the target rotation speed variation rate.

When the release-side element is kept in the slipping state for the entire shifting phase in accordance with the characteristic structure of the present application, depending on the magnitude of the output torque from the rotating electrical machine, a reduction in the rotation speed of the input member may possibly become sluggish, which results in an unduly long shifting time. With this arrangement, a reduction in the rotation speed of the input member that is prone to be sluggish due to the release-side element being kept in the slipping state can be supplemented by a variation in the engage-side oil pressure, such that the shifting operation can appropriately end within the target shifting time.

A reference oil pressure variation amount that is required for varying the rotation speed of the input member at the target rotation speed variation rate may be determined based on the target rotation speed variation rate, and the engage-side oil pressure may be varied in accordance with a degree of progress of the shifting phase and the output torque from the rotating electrical machine based on the reference oil pressure variation amount.

The smaller the absolute value of the negative torque (regenerative torque) output from the rotating electrical machine becomes, the greater the possibility of a reduction in the rotation speed of the input member becoming sluggish becomes due to the release-side element being kept in the slipping state. It is preferable that, when this reduction in the rotation speed of the input member is supplemented by a variation in the engage-side oil pressure, the variation may be executed from the initial stage in the shifting phase.

With the structure, the engage-side oil pressure can appropriately be varied so as to be commensurate with the degree of progress of the shifting phase and the output torque from the rotating electrical machine. By varying the engage-side oil pressure further based on the reference oil pressure variation amount, it becomes possible to vary the rotation speed of the input member at the target rotation speed variation rate and allow the shifting operation to end appropriately within the target shifting time.

More specifically, in a structure in which the engage-side oil pressure is varied using the engage-side oil pressure at the start of the shifting phase as a standard of reference, based on a prescribed variation coefficient that is preset in accordance with the degree of progress of the shifting phase and the output torque from the rotating electrical machine, and based on the reference oil pressure variation amount, the variation coefficient may be set to a value that becomes greater as the shifting phase progresses at least at a first stage among a plurality of stages set in accordance with the degree of progress of the shifting phase and becomes smaller as the shifting phase progresses at least at a final stage, and that becomes greater as the output torque from the rotating electrical machine varies in a positive direction when the output torque from the rotating electrical machine is negative.

With this structure, the variation coefficient is set to a value that becomes greater at the first stage, which are included in the plurality of the stages set in accordance with the degree of progress of the shifting phase, as the shifting phase progresses, and that becomes smaller at the final stage as the shifting phase progresses. Therefore, at the first stage where demand for supplementing a reduction in the rotation speed of the input member is greater, the reduction in the rotation speed of the input member can appropriately be supplemented by increasing the engage-side oil pressure. On the other hand, at the final stage, the engage-side oil pressure is reduced, such that an excessive reduction in the rotation speed of the input member can be suppressed.

Further, when the output torque from the rotating electrical machine is negative, the variation coefficient is set to a value that becomes greater as the output torque from the rotating electrical machine varies in the positive direction (i.e., as the negative torque output from the rotating electrical machine varies in the positive direction and approaches zero). Therefore, the engage-side oil pressure can greatly be increased in a situation where the absolute value of the negative torque output from the rotating electrical machine is small and therefore the demand for supplementing a reduction in the rotation speed of the input member is great, such that the reduction in the rotation speed of the input member can appropriately be supplemented.

With the structure described above, by using the variation coefficient commensurate with the degree of progress of the shifting phase and the output torque from the rotating electrical machine as well as the reference oil pressure variation amount, the engage-side oil pressure can appropriately be varied based on relatively simple calculations.

At an initial stage in the shifting phase, variation rate control may be exerted to reduce the release-side oil pressure at a pressure-reducing variation rate that is commensurate with the magnitude of the output torque from the rotating electrical machine, and after the variation rate control is exerted and at and following a prescribed switching point, rotation speed control may be exerted to vary the release-side oil pressure such that the rotation speed of the input member reaches a target rotation speed at each time point after the variation rate control is exerted.

With this structure, at an initial stage in the shifting phase, by exerting relatively simple control under which the release-side oil pressure is gradually reduced so that the proportion of the release-side element slipping is gradually increased, a rapid variation in the rotation speed of the input member can be suppressed. On the other hand, at a latter stage in the shifting phase at and following the prescribed switching point, by successively varying the release-side oil pressure so as to be commensurate with the target rotation speed, the rotation speed of the input member at each time point can appropriately be varied while being placed under accurate control, and a rapid variation in the rotation speed of the input member can be suppressed. Accordingly, with relatively simple control as a whole, the occurrence of the shift shock can be suppressed.

The prescribed switching point in this case may be set based on the rotation speed of the input member, the time from the start of the variation rate control, a level of the release-side oil pressure, or the like.

Under the rotation speed control, the target rotation speed at each time point in the shifting phase may be set to plot a time course along which an absolute value of a temporal variation rate of the target rotation speed becomes smaller toward a terminal stage in the shifting phase.

With this structure, the occurrence of the shift shock can further surely be suppressed by appropriately setting the target rotation speed at each time point of the shifting phase.

Under the rotation speed control, the target rotation speed variation rate of the input member may be determined based on the preset target shifting time that represents the target required time for switching between the shift speeds, and the rotation speed variation width that represents the difference in the rotation speed of the input member before and after the switching of the shift speeds, and control may be exerted to vary the release-side oil pressure such that the actual rotation speed variation rate of the input member follows the target rotation speed variation rate.

The shift shock generally occurs when the rotation speed of the input member varies rapidly. In other words, the occurrence of the shift shock is strongly related to the temporal variation rate of the rotation speed of the input member. Accordingly, as in the structure described above, by setting a target value of the rotation speed variation rate of the input member at each time point and varying the release-side oil pressure such that the actual rotation speed variation rate of the input member follows the target rotation speed variation rate at each time point, a rapid variation in the rotation speed of the input member can more surely be suppressed, and accordingly the occurrence of the shift shock can more surely be suppressed.

DETAILED DESCRIPTION OF THE EMBODIMENTS

Figure 1:
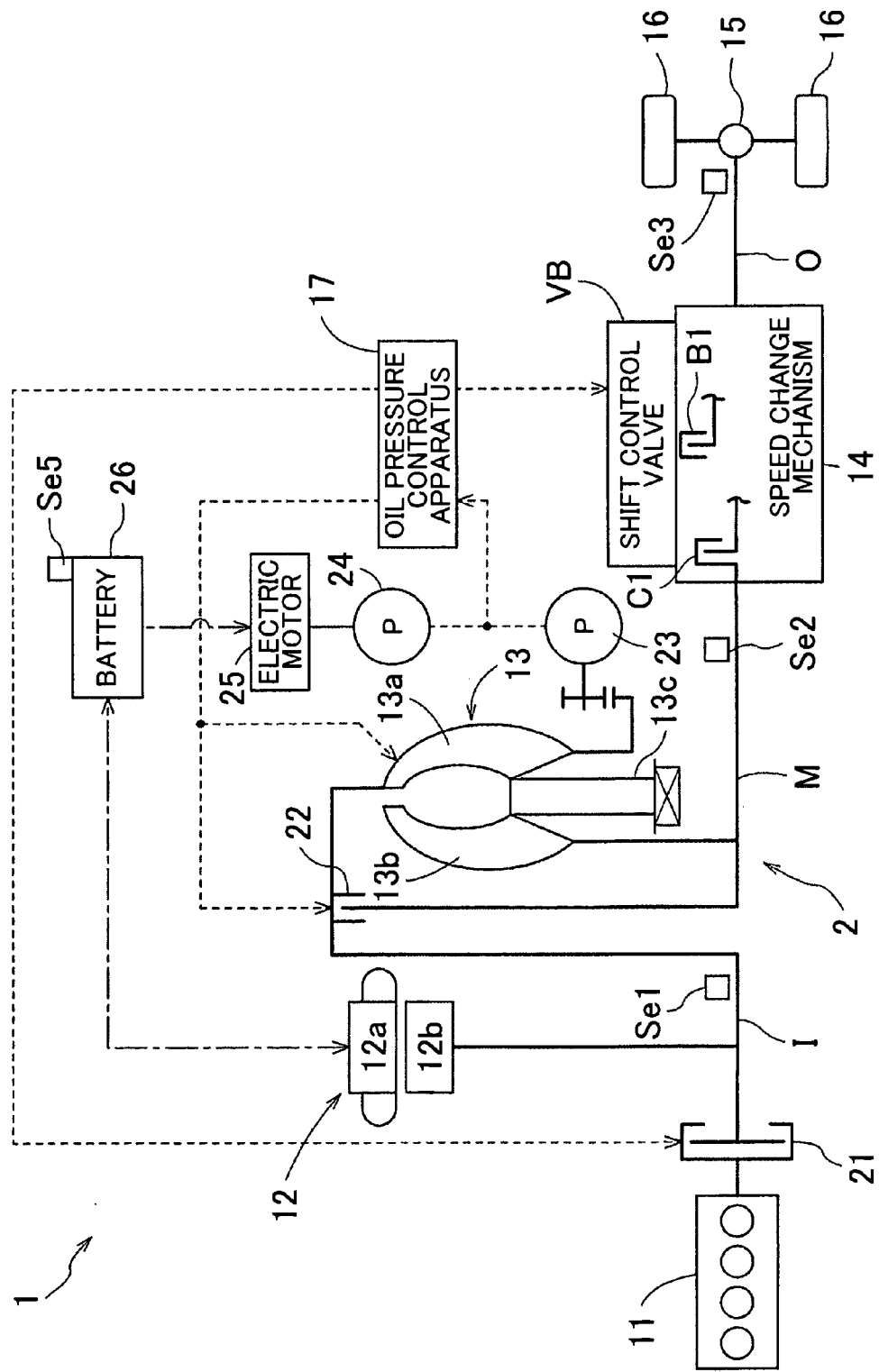
FIG. 1 is a schematic diagram showing the structure of a vehicular driving apparatus that includes a transmission apparatus and a control unit according to the present embodiment.
Figure 2:
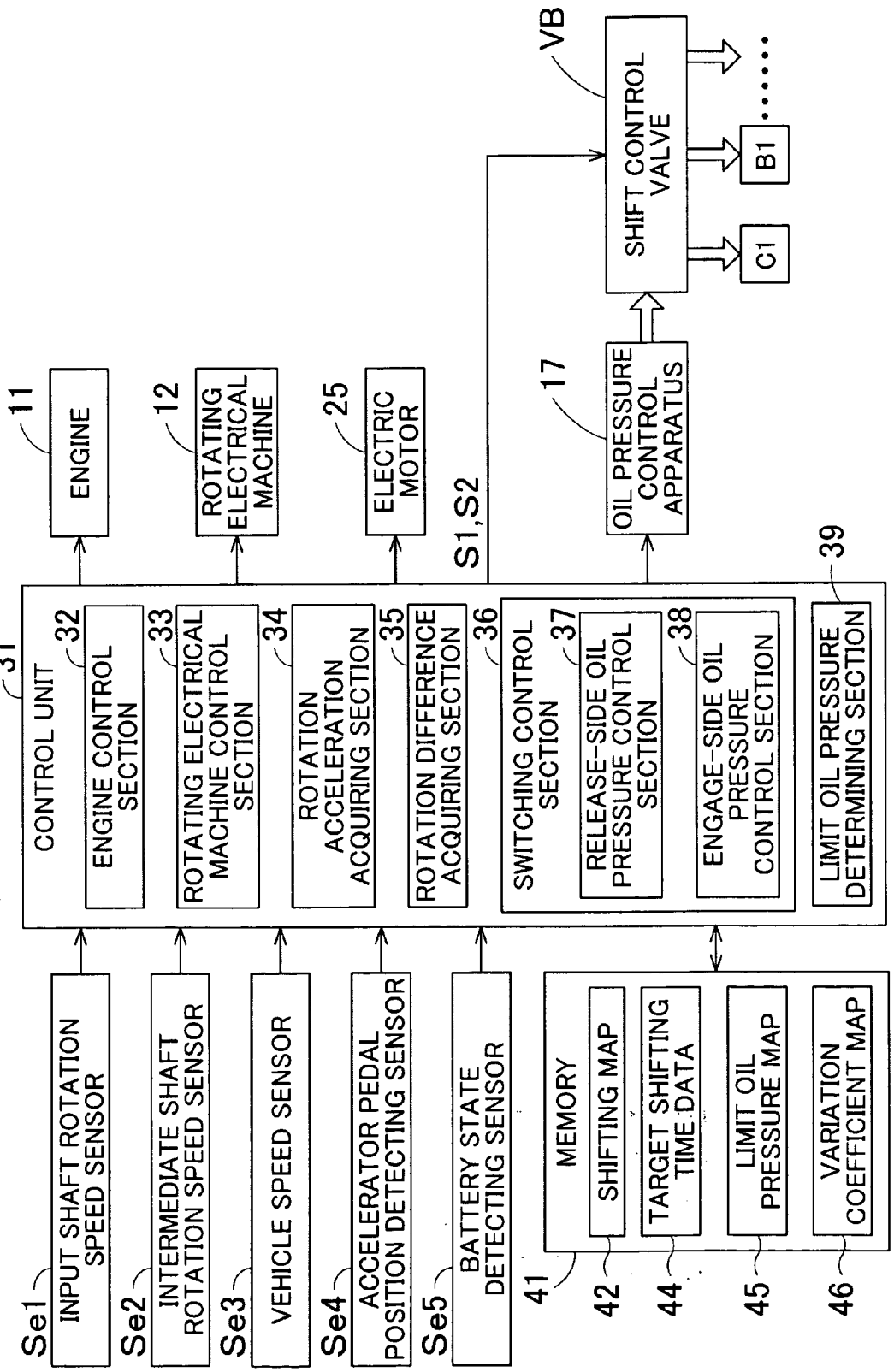
FIG. 2 is a block diagram showing the structure of the control unit according to the present embodiment.

An embodiment of the present invention will now be described with reference to the accompanying drawings. In the present embodiment, the description will be given of an example in which a control apparatus according to the present invention is applied to a transmission apparatus 2 that structures part of a vehicular driving apparatus 1 for hybrid vehicles. FIG. 1 is a schematic diagram showing the structure of a drivetrain system and an oil pressure control system of the vehicular driving apparatus 1 that includes the transmission apparatus 2 according to the present embodiment. In the drawing, the solid line represents the transfer route of driving force; the dash line represents the supply route of hydraulic oil; and the alternate long and short dash line represents the supply route of electric power. As shown in the drawing, the vehicular driving apparatus 1 according to the present embodiment is structured to schematically include an engine 11 and a rotating electrical machine 12 as driving force sources so as to transfer the driving force from the driving force sources to wheels 16 via a torque converter 13 and a speed change mechanism 14. The vehicular driving apparatus 1 further includes an oil pressure control apparatus 17 for supplying hydraulic oil of a prescribed oil pressure to components such as the torque converter 13, the speed change mechanism 14 and the like. FIG. 2 is a block diagram showing the structure of a control unit 31 according to the present embodiment. In the drawing, the solid lines represent transmission routes of signals, and the outlined arrows represent supply routes of hydraulic oil. As shown in the drawing, the control unit 31 of the present embodiment is structured to exert control over the components of the vehicular driving apparatus 1, including the oil pressure control apparatus 17.

In the present embodiment, the control unit 31 corresponds to the "control apparatus" of the present invention.

Structure of Drivetrain System of Vehicular Driving Apparatus

First, a description is given of the structure of the drivetrain system of the vehicular driving apparatus 1 according to the present embodiment. As shown in FIG. 1, the vehicular driving apparatus 1 includes the engine 11 and the rotating electrical machine 12 as the driving force sources for driving the vehicle. The engine 11 and the rotating electrical machine 12 are drivably connected in series, thereby embodying a parallel type driving apparatus for hybrid vehicles. The vehicular driving apparatus 1 further includes the torque converter 13 and the speed change mechanism 14 so as to shift the rotation speed of the engine 11 and the rotating electrical machine 12 serving as the driving force sources, and convert torque and transfer the force to an output shaft O.

The engine 11 is an internal combustion engine driven by the combustion of fuel, and it may be any known engine such as a gasoline engine, a diesel engine or the like. In the present embodiment, the output rotation shaft of the engine 11 such as a crankshaft or the like is drivably connected to an input shaft I via a transmission clutch 21. Thus, the input shaft I is drivably connected in a selective manner to the engine 11 via the transmission clutch 21. The transmission clutch 21 is supplied with hydraulic oil having its pressure adjusted by the oil pressure control apparatus 17 so as to operate, under control of an oil pressure control valve (not shown). Another preferable structure may be the output rotation shaft of the engine 11 being drivably connected to the input shaft I in an integrated manner, or being drivably connected to the input shaft I via another member such as a damper.

The rotating electrical machine 12 includes a stator 12a fixed to a case (not shown) and a rotor 12b being rotatably supported radially inside of the stator 12a. The rotor 12b of the rotating electrical machine 12 is drivably connected to the input shaft I so as to integrally rotate therewith. In other words, in the present embodiment, both the engine 11 and the rotating electrical machine 12 are drivably connected to the input shaft I. The rotating electrical machine 12 is electrically connected to a battery 26 serving as an electric power storage apparatus. Here, the rotating electrical machine 12 is designed so as to be capable of functioning as a motor (electric motor) that is supplied with electric power to generate motive power, and as a generator (electric power generator) that is supplied with motive power to generate electric power. In other words, the rotating electrical machine 12 is supplied with electric power from the battery 26 to run, or generates electric power by rotational driving force transferred from the engine 11 or the wheels 16 and stores the generated power in the battery 26. The battery 26 is merely an example of electric power storage apparatuses. Therefore, any other electric power storage apparatus, such as a capacitor, may be employed and, alternatively, a combination of a plurality of types of electric power storage apparatuses may be employed.

With the vehicular driving apparatus 1, the rotational driving force from both the engine 11 and the rotating electrical machine 12 is transferred to the wheels 16 to allow the vehicle to travel. Here, depending on the state of charge of the battery 26, the rotating electrical machine 12 can generate driving force by any one of electric power supply from the battery 26 and the rotational driving force of the engine 11. Further, in a deceleration mode of the vehicle (upon deceleration demand), the transmission clutch 21 is released and the engine 11 is stopped, and the rotating electrical machine 12 generates regenerative torque to generate electric power by the rotational driving force transferred from the wheels 16.

The electric power generated by the rotating electrical machine 12 is stored in the battery 26. When the vehicle is stopped, the transmission clutch 21 is released, and both the engine 11 and the rotating electrical machine 12 are stopped.

The torque converter 13 is drivably connected to the input shaft I. The torque converter 13 is an apparatus that transfers rotational driving force of the input shaft I, which is drivably connected to the engine 11 and the rotating electrical machine 12 serving as the driving force sources, to the speed change mechanism 14 via an intermediate shaft M. The torque converter 13 includes a pump impeller 13a as an input side rotary member that is drivably connected to the input shaft I, a turbine runner 13b as an output side rotary member that is drivably connected to the intermediate shaft M, and a stator 13c arranged between the pump impeller 13a and the turbine runner 13b and that is provided with a one-way clutch. The torque converter 13 transfers, via hydraulic oil contained therein, the driving force between the driving-side pump impeller 13a and the following-side turbine runner 13b. The intermediate shaft M is drivably connected to both the engine 11 and the rotating electrical machine 12 via the torque converter 13, the input shaft I, and the transmission clutch 21. In the present embodiment, the intermediate shaft M corresponds to the "input member" in the present invention.

Here, the torque converter 13 is provided with a lock-up clutch 22 serving as a friction engagement element for achieving lock-up. The lock-up clutch 22 is a clutch that connects the pump impeller 13a and the turbine runner 13b so as to rotate in an integrated manner, such that the difference in rotation (slip) between the pump impeller 13a and the turbine runner 13b is eliminated in order to improve the transfer efficiency. Accordingly, when the lock-up clutch 22 is engaged, the torque converter 13 directly transfers the driving force of the driving force source (input shaft I) to the speed change mechanism 14 (intermediate shaft M), without having the hydraulic oil involved. In the present embodiment, the lock-up clutch 22 is basically in an engaged state so as to operate in a state where the input shaft I and the intermediate shaft M integrally rotate. Accordingly, in the present embodiment, the input shaft I and the intermediate shaft M basically rotate at equal rotation speeds. However, in some cases such as when downshifting the shift speed, or when exerting regular shifting control, which will be described later, the lock-up clutch 22 is released for transferring the driving force via the torque converter 13 so as to suppress shock occurring at the vehicle due to the shifting operation (shift shock). The torque converter 13, together with the lock-up clutch 22, is supplied with the hydraulic oil having its pressure adjusted by the oil pressure control apparatus 17.

The speed change mechanism 14 is drivably connected to the intermediate shaft M serving as the output shaft of the torque converter 13. In other words, the intermediate shaft M functions as the input shaft of the speed change mechanism 14. The speed change mechanism 14 is an apparatus that shifts the rotation speed of the intermediate shaft M and transmits the shifted speed to the output shaft O on the wheels 16 side. In the present embodiment, the intermediate shaft M, the speed change mechanism 14 and the output shaft O structure the "transmission apparatus" of the present invention. Here, the speed change mechanism 14 is a stepped automatic transmission apparatus (stepped transmission apparatus) having a plurality of shift speeds. In the present embodiment, the speed change mechanism 14 has three shift speed stages (first, second and third speeds) (not shown) differing in gear ratio (reduction ratio). In order to form the shift speeds, the speed change mechanism 14 is structured to have a gear mechanism such as a planetary gear mechanism, and a plurality of friction engagement elements. FIG. 1 schematically shows a clutch C1 and a brake B1 as an example of such a plurality of friction engagement elements. The control exerted over the engagement and the release of the plurality of friction engagement elements switches the three shift speeds.

When switching the shift speeds, one of the friction engagement elements engaged prior to the shifting is released and one of the friction engagement elements released prior to the shifting is engaged. Thus, the rotation state of a plurality of rotary elements included in the gear mechanism is switched, whereby the target shift speed is established. At a prescribed gear ratio that is set for each shift speed, the speed change mechanism 14 shifts the rotation speed of the intermediate shaft M and converts the torque so as to transfer the force to the output shaft O serving as an output member. The rotational driving force transferred from the speed change mechanism 14 to the output shaft O is then transferred to the wheels 16 via a differential apparatus 15. In the present embodiment, the input shaft I, the intermediate shaft M, and the output shaft O are all coaxially arranged, i.e., are arranged in a uniaxial structure.

Structure of Oil Pressure Control System

Next, a description will be given of the oil pressure control system of the vehicular driving apparatus 1. The oil pressure control system includes two types of pumps, i.e., a mechanical pump 23 and a motor-driven pump 24 as shown in FIG. 1, which serve as oil pressure sources for pumping up hydraulic oil accumulated in an oil pan (not shown) and supplying the hydraulic oil to the components of the vehicular driving apparatus 1. Here, the mechanical pump 23 is an oil pump that operates by the rotational driving force of the input shaft I (i.e., of the engine 11 and the rotating electrical machine 12 serving as the driving force sources). Preferable examples of the mechanical pump 23 may be a gear pump and a vane pump. In the present embodiment, the mechanical pump 23 is drivably connected to the input shaft I via the pump impeller 13a of the torque converter 13, and driven by the rotational driving force of one or both of the engine 11 and the rotating electrical machine 12. The mechanical pump 23 basically has more than enough discharge capacity for supplying the hydraulic oil in an amount required by the vehicular driving apparatus 1. However, the mechanical pump 23 does not discharge hydraulic oil while the input shaft I is stopped (in other words, while the vehicle is stopped). Additionally, the mechanical pump 23 discharges hydraulic oil while the input shaft I is rotating at low speeds (in other words, while the vehicle is traveling at low speeds), but in some cases the mechanical pump 23 cannot supply an adequate amount of hydraulic oil as required by the vehicular driving apparatus 1. Accordingly, the vehicular driving apparatus 1 includes the motor-driven pump 24 serving as an auxiliary pump for supplementing the capacity of the mechanical pump 23.

The motor-driven pump 24 is an oil pump that operates by the driving force of an electric motor 25 for driving the pump, independently of the rotational driving force of the input shaft I (the driving force source). Also herein, preferable examples of the motor-driven pump 24 may be a gear pump and a vane pump. The electric motor 25 that drives the motor-driven pump 24 is electrically connected to the battery 26, and supplied with electric power from the battery 26 so as to generate driving force. The motor-driven pump 24 is an auxiliary pump for supplementing the capacity of the mechanical pump 23, and operates in a situation where the required hydraulic oil amount is not supplied from the mechanical pump 23, such as when the vehicle is stopped or traveling at low speeds.

The oil pressure control system further includes the oil pressure control apparatus 17 for adjusting the oil pressure of hydraulic oil supplied from the mechanical pump 23 and the motor-driven pump 24 to a prescribed pressure. Although it is not detailed herein, the oil pressure control apparatus 17 adjusts the opening amount of at least one regulating valve based on a signal pressure from a linear solenoid valve for adjusting the oil pressure so as to adjust the amount of hydraulic oil drained from the regulating valve, thereby adjusting the hydraulic oil pressure to at least one prescribed pressure. The hydraulic oil adjusted to the prescribed pressure is supplied to the transmission clutch 21, the lock-up clutch 22, the torque converter 13, and the plurality of friction engagement elements C1, B1, . . . of the speed change mechanism 14 at each required oil pressure level.

Here, the hydraulic oil is supplied from the oil pressure control apparatus 17 via a shift control valve VB individually to the plurality of friction engagement elements C1, B1, . . . of the speed change mechanism 14 is, as shown in FIG. 2. Here, the shift control valve VB adjusts the opening amount of the valve in accordance with control command signals S1 and S2 received from the control unit 31 so as to supply the hydraulic oil adjusted to the oil pressure according to the control command signals to the friction engagement elements C1, B1, . . . . Each of the friction engagement elements C1, B1, . . . is structured to include a plurality of friction members and a piston, and the piston moves in accordance with the pressure of the supplied hydraulic oil. At pressures of the hydraulic oil being under a stroke end pressure Pse, the plurality of friction members come closer to one another in accordance with an increase in the oil pressure while being kept away from one another. At the stroke end pressure Pse, the plurality of friction members contact one another without transferring any torque. At pressures higher than the stroke end pressure Pse, the plurality of friction members transfer torque corresponding to the magnitude of the pressure of the hydraulic oil. The present invention is characterized by the control exerted over each of the engagement and the release of the plurality of friction engagement elements, when the speed change mechanism 14 switches shift speeds. This will be described later.

Structure of the Control Unit

Next, a description will be given of the structure of the control unit 31 according to the present embodiment. As shown in FIG. 2, the control unit 31 included in the vehicular driving apparatus 1 functions as a core member that controls operations of the components of the vehicular driving apparatus 1. The control unit 31 includes a computing apparatus such as a CPU as the core member, and is structured to further include storage apparatuses, such as RAM (Random Access Memory) structured to be capable of writing/reading data to/from the computing apparatus and ROM (Read Only Memory) structured to be capable of reading data from the computing apparatus (each not shown). The functional sections 32 to 39 in the control unit 31 are structured with software (program) stored in the ROM and the like, or separately provided hardware such as arithmetic circuitry, or the combination of them. The functional sections 32 to 39 are each structured to be capable of exchanging information among one another. A memory 41 includes any recording medium that can store and rewrite information, such as flash memory, as a hardware structure, and is structured to be capable of exchanging information with the control unit 31. The memory 41 may optionally be arranged in any storage apparatus included in the control unit 31.

As shown in FIGS. 1 and 2, the vehicular driving apparatus 1 includes a plurality of sensors provided at respective portions, specifically, an input shaft rotation speed sensor Se1, an intermediate shaft rotation speed sensor Se2, a vehicle speed sensor Se3, an accelerator pedal position detecting sensor Se4, and a battery state detecting sensor Se5. Here, the input shaft rotation speed sensor Se1 is a sensor that detects the rotation speed of the input shaft I. The intermediate shaft rotation speed sensor Se2 is a sensor that detects the rotation speed of the intermediate shaft M. The vehicle speed sensor Se3 is a sensor that detects the rotation speed of the wheels 16, i.e., the vehicle speed. The accelerator pedal position detecting sensor Se4 is a sensor that detects the operated amount of the accelerator pedal (not shown) so as to detect the accelerator pedal position. The battery state detecting sensor Se5 is a sensor that detects the battery state such as a state of charge or voltage values of the battery 26. The information representing the detection result of the sensors Se1 to Se5 is provided to the control unit 31.

As shown in FIG. 2, the control unit 31 includes an engine control section 32, a rotating electrical machine control section 33, a rotation acceleration acquiring section 34, a rotation difference acquiring section 35, a switching control section 36, and a limit oil pressure determining section 39. The switching control section 36 includes, as its lower order functional sections, a release-side oil pressure control section 37 and an engage-side oil pressure control section 38. The memory 41 to which the functional sections 32 to 39 included in the control unit 31 refer has stored therein a shifting map 42, a target shifting time data 44, a limit oil pressure map 45, and a variation coefficient map 46. In the following, the functional sections 32 to 39 in the control unit 31 will be described in detail.

The engine control section 32 is a functional section that controls the operations of the engine 11. The engine control section 32 determines an engine operation point and controls the engine 11 such that the engine 11 operates at the engine operation point. Here, the engine operation point is a control command value representing the control target point of the engine 11, and is determined by a rotation speed and torque. In more detail, the engine operation point is a command value representing the control target point of the engine 11 determined in consideration of a vehicle demanded output (that is determined based on vehicle demanded torque and an engine rotation speed) and the optimum fuel efficiency, and is determined by a rotation speed command value and a torque command value. The engine control section 32 controls the engine 11 such that the engine 11 operates at the torque and the rotation speed indicated by the engine operation point.

The rotating electrical machine control section 33 is a functional section that controls the operations of the rotating electrical machine 12. The rotating electrical machine control section 33 determines a rotating electrical machine operation point and controls the rotating electrical machine 12 such that the rotating electrical machine 12 operates at the rotating electrical machine operation point. Here, the rotating electrical machine operation point is a control command value representing the control target point of the rotating electrical machine 12, and is obtained based on a rotation speed and torque. In more detail, the rotating electrical machine operation point is a command value representing the control target point of the rotating electrical machine 12 determined in consideration of a vehicle demanded output and the engine operation point, and is obtained based on a rotation speed command value and a torque command value. The rotating electrical machine control section 33 controls the rotating electrical machine 12 such that the rotating electrical machine 12 operates at the torque and the rotation speed indicated by the rotating electrical machine operation point. The rotating electrical machine control section 33 also exerts control, in accordance with the state of charge of the battery 26 detected by the battery state detecting sensor Se5, so as to switch between a state where the rotating electrical machine 12 is caused to generate driving force by electric power supplied from the battery 26, and a state where the rotating electrical machine 12 is caused to generate electric power by the rotational driving force of the engine 11 and the like.

Here, when the torque command value is positive, the rotating electrical machine 12 produces positive driving torque while rotating in the positive direction so as to generate driving force. When the torque command value is negative, the rotating electrical machine 12 produces negative regenerative torque while rotating in the positive direction so as to generate electric power. Thus, in both cases, the output torque (including driving torque and regenerative torque) output from the rotating electrical machine 12 is determined by the torque command value from the rotating electrical machine control section 33. In the present embodiment, information of the torque command value determined by the rotating electrical machine control section 33 is also provided to the limit oil pressure determining section 39. Further, the rotating electrical machine control section 33 is structured to control the rotation speed of the electric motor 25 for driving the motor-driven pump 24.

The rotation acceleration acquiring section 34 is a functional section that acquires actual rotation acceleration AM of the intermediate shaft M. In the present embodiment, the rotation acceleration acquiring section 34 successively accepts entries of information on actual rotation speeds of the intermediate shaft M detected by the intermediate shaft rotation speed sensor Se2 and calculates a variation amount in rotation speed per unit time, thereby acquiring the rotation acceleration (rotation speed variation rate) AM. The information related to the actual rotation acceleration AM of the intermediate shaft M acquired by the rotation acceleration acquiring section 34 is provided to the release-side oil pressure control section 37 of the switching control section 36.

The rotation difference acquiring section 35 is a functional section that acquires a rotation speed difference $\Delta N$ that is a difference in rotation speed between a target rotation speed NT of the intermediate shaft M, which is obtained based on an actual rotation speed NO of the output shaft O, and an actual rotation speed NM of the intermediate shaft M. Here, the target rotation speed NT of the intermediate shaft M is obtained by multiplying the actual rotation speed NO of the output shaft O detected by the vehicle speed sensor Se3 by the gear ratio for each shift speed of the speed change mechanism 14. The actual rotation speed NM of the intermediate shaft M is detected by the intermediate shaft rotation speed sensor Se2. Here, as the absolute value of a value obtained by subtracting the actual rotation speed NM from the target rotation speed NT of the intermediate shaft M, the rotation speed difference $\Delta N$ is acquired. The information related to the rotation speed difference $\Delta N$ acquired by the rotation difference acquiring section 35 is provided to the release-side oil pressure control section 37 and the engage-side oil pressure control section 38 included in the switching control section 36.

Figure 3:
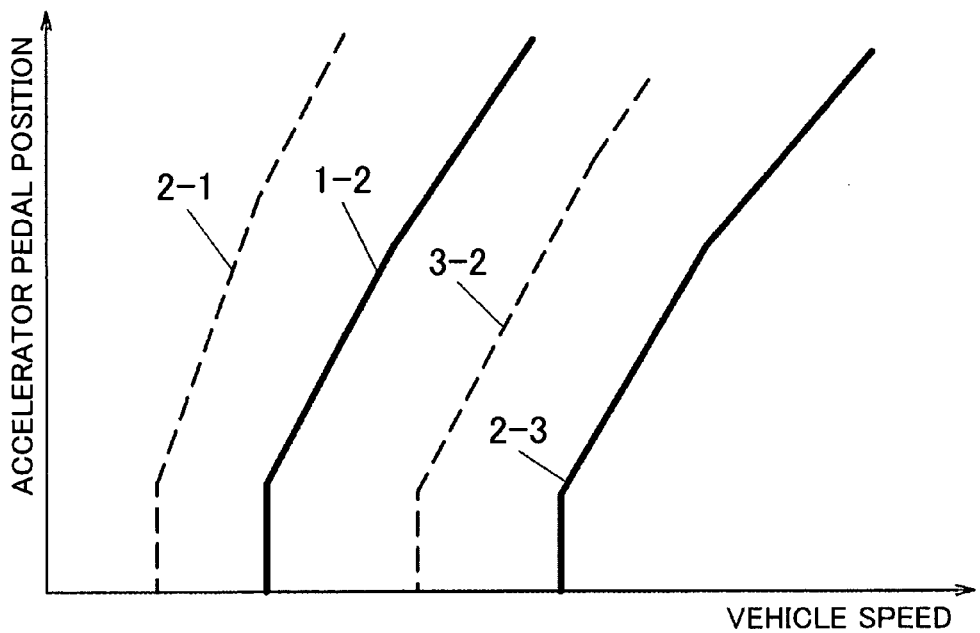
FIG. 3 shows an exemplary shifting map according to the present embodiment.

The switching control section 36 is a functional section that determines a target shift speed in the speed change mechanism 14 based on the accelerator pedal position of the vehicle and the vehicle speed, and that controls the operations of the shift control valve VB in accordance with the determined target shift speed, thereby exerting control to switch the shift speed of the speed change mechanism 14. In order to determine such a target shift speed, the switching control section 36 refers to the shifting map 42 stored in the memory 41. FIG. 3 shows one exemplary shifting map 42 according to the present embodiment. The shifting map 42 is a map where the shift schedule of the shift speeds of the speed change mechanism 14 is set based on the accelerator pedal position and the vehicle speed. As shown in the drawing, a plurality of upshift lines and a plurality of downshift lines are set, each represented by a line substantially rising diagonally up and to the right (which means, as the vehicle speed increases, the accelerator pedal position increases as well). Here, the upshift lines define the shift schedule from a lower speed to a higher speed between the two adjacent shift speeds in the speed change mechanism 14, whereas the downshift lines define the shift schedule from a higher speed to a lower speed. In the present embodiment, because the speed change mechanism 14 has three shift speeds, an upshift line from the first speed to the second speed, an upshift line from the second speed to the third speed, a downshift line from the second speed to the first speed, and a downshift line from the third speed to the second speed are set. To upshift as used herein means switching to a shift speed that is smaller in gear ratio (reduction ratio) with reference to the gear ratio of the shift speed prior to the shifting, whereas to downshift means switching to a shift speed that is greater in gear ratio.

When a target shift speed in the speed change mechanism 14 is determined, a friction engagement element corresponding to the determined target shift speed is supplied with hydraulic oil so as to enter an engaged state, whereby the target shift speed is established. When the vehicle speed and the accelerator pedal position vary and cross an upshift or downshift line on the shifting map shown in FIG. 3, the switching control section 36 determines a new target shift speed in the speed change mechanism 14 based on the vehicle accelerator pedal position and the vehicle speed. A friction engagement element corresponding to the determined target shift speed is supplied with hydraulic oil so as to enter an engaged state, whereby the new shift speed is established. Here, one of the friction engagement elements engaged prior to the shifting is released and one of the friction engagement elements released prior to the shifting is engaged. For example, when the shift speed in the speed change mechanism 14 is switched from the second speed to the third speed so as to be upshifted, a first clutch C1 is released and a first brake B1 is engaged. In this case, when the shift speed in the speed change mechanism 14 is switched from the third speed to the second speed so as to be downshifted, the first brake B1 is released and the first clutch C1 is engaged.

The engagement and the release of the friction engagement elements C1, B1, . . . associated with the upshift or the downshift of any shift speed are controlled by the release-side oil pressure control section 37 and the engage-side oil pressure control section 38. The release-side oil pressure control section 37 is a functional section that controls the pressure of hydraulic oil (release-side oil pressure) on the friction engagement element that is to be released (release-side element). The release-side oil pressure control section 37 provides a release-side control command signal S1 serving as a control signal to the shift control valve VB, and controls the operations of a control valve of the shift control valve VB corresponding to the release-side element basically in accordance with the release-side control command signal S1, thereby controlling the release-side oil pressure. However, as will be described later, when the switching control section 36 exerts special shifting control, the release-side oil pressure control section 37 controls the release-side oil pressure based on the release-side control command signal S1 only at an initial stage in the shifting phase TP. The release-side oil pressure control section 37 thereafter controls the release-side oil pressure based on the actual rotation acceleration AM of the intermediate shaft M and irrespective of the release-side control command signal S1.

The engage-side oil pressure control section 38 is a functional section that controls the pressure of hydraulic oil (engage-side oil pressure) on the friction engagement element that is to be engaged (engage-side element). The engage-side oil pressure control section 38 provides an engage-side control command signal S2 serving as a control signal to the shift control valve VB, and controls the operations of a control valve of the shift control valve VB corresponding to the engage-side element in accordance with the engage-side control command signal S2, thereby controlling the engage-side oil pressure. Details of the release-side oil pressure control exerted by the release-side oil pressure control section 37 and the engage-side oil pressure control exerted by the engage-side oil pressure control section 38 will be described later.

The limit oil pressure determining section 39 is a functional section that determines a limit oil pressure as the reference for determining a set lower limit value of the pressure of hydraulic oil (release-side oil pressure) on the friction engagement element that is to be released (release-side element). In the present embodiment, the limit oil pressure determining section 39 is structured to set two limit oil pressures, namely, a first limit oil pressure PL1 corresponding to the output torque of the rotating electrical machine 12 and a second limit oil pressure PL2 corresponding to the accelerator pedal position detected by the accelerator pedal position detecting sensor Se4, the two limit oil pressures being set independently of each other.

Figure 4:
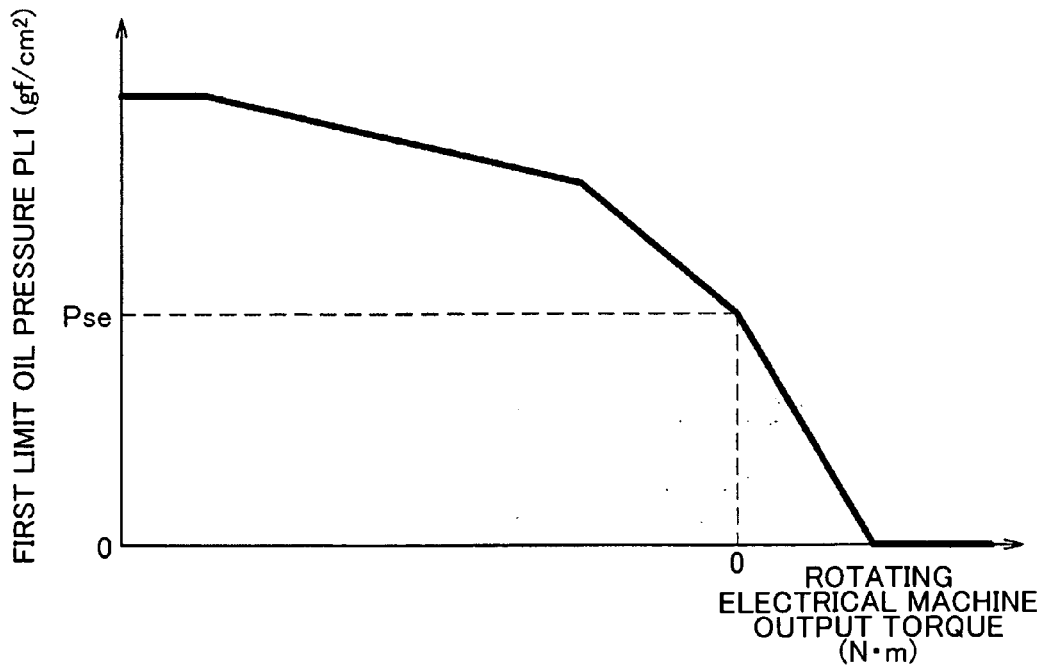
FIG. 4 shows an exemplary first limit oil pressure map according to the present embodiment.

The first limit oil pressure PL1 is set to be a value that is commensurate with the magnitude of the output torque of the rotating electrical machine 12 (in the present embodiment, the output torque is determined by a torque command value from the rotating electrical machine control section 33), and that is equal to or greater than the stroke end pressure Pse of the release-side element when the output torque of the rotating electrical machine 12 is negative. As used herein, the stroke end pressure Pse of the release-side element means the release-side oil pressure at the timing immediately before the piston has moved to eliminate the clearance of the friction member of the release-side element and the release-side element begins to have a torque capacity. By setting the first limit oil pressure PL1 to be a value at least equal to or greater than the stroke end pressure Pse, the engagement pressure on the release-side element is allowed to be greater than at least zero when the output torque of the rotating electrical machine 12 is negative, so that the release-side element is allowed to have a torque capacity. When the output torque of the rotating electrical machine 12 is positive, the first limit oil pressure PL1 may assume a value smaller than the stroke end pressure Pse of the release-side element. FIG. 4 shows one exemplary first limit oil pressure map that defines the relationship between the output torque of the rotating electrical machine 12 and the first limit oil pressure PL1. As shown in FIG. 4, in the present embodiment, the first limit oil pressure PL1 is set to a value that is equal to the stroke end pressure Pse of the release-side element when the output torque of the rotating electrical machine 12 is zero, and that becomes greater as the output torque of the rotating electrical machine 12 becomes greater in the negative direction (i.e., as the regenerative torque becomes greater). The first limit oil pressure map is structured to form part of the limit oil pressure map 45 stored in the memory 41. By setting the first limit oil pressure PL1 in this manner, in the present embodiment, when the rotating electrical machine 12 outputs negative torque (regenerative torque) and generates electric power, the release-side oil pressure is kept at a higher oil pressure that is equal to or higher than the stroke end pressure Pse as the absolute value of the negative torque is greater for the entire shifting phase TP. The first limit oil pressure map shown in FIG. 4 is merely an example, and can be modified as appropriate in consideration of the vehicle characteristics and the like.

Figure 5:
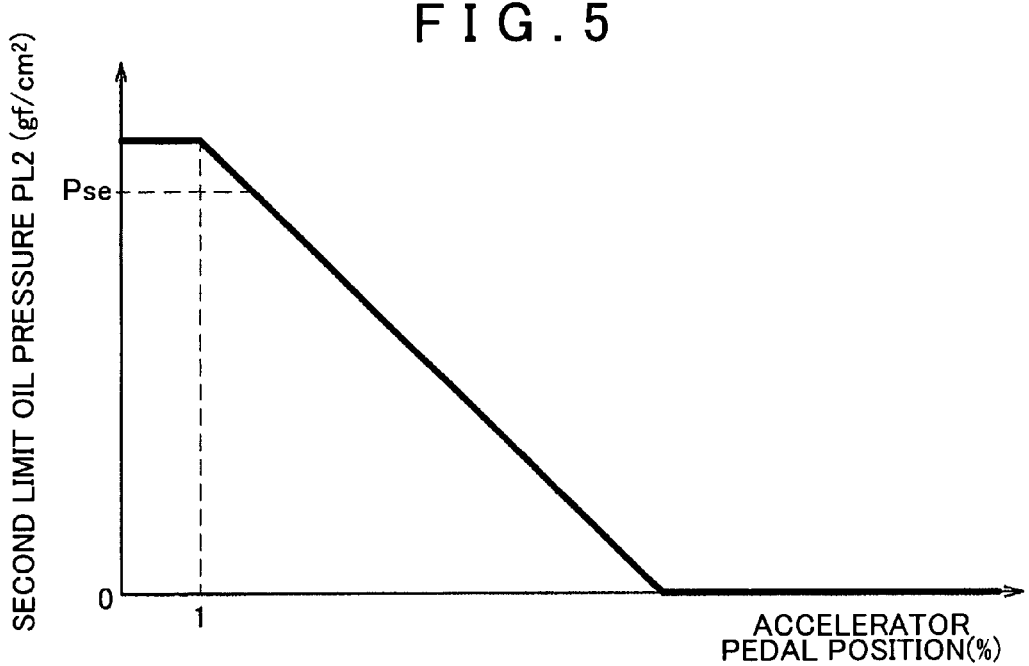
FIG. 5 shows an exemplary second limit oil pressure map according to the present embodiment.

The second limit oil pressure PL2 is set to a value that is commensurate with the accelerator pedal position, and that is equal to or greater than the stroke end pressure Pse of the release-side element in an accelerator pedal light depression position state where the accelerator pedal position is equal to or smaller than a prescribed value. Here, in the present embodiment, "1%" is set as the prescribed value, and a state where the accelerator pedal position detected by the accelerator pedal position detecting sensor Se4 is substantially equal to zero, i.e., a state where the depressed amount of the accelerator pedal is substantially totally zero, is the "accelerator pedal light depression position state". In the accelerator pedal light depression position state, by setting the second limit oil pressure PL2 to be a value at least equal to or greater than the stroke end pressure Pse, the engagement pressure of the release-side element is allowed to be greater than at least zero, so that the release-side element is allowed to have a torque capacity. When the accelerator pedal position is greater than the prescribed value, the second limit oil pressure PL2 may assume a value smaller than the stroke end pressure Pse of the release-side element. In the present embodiment, in a state where the accelerator pedal position is greater than 1%, the second limit oil pressure PL2 is set to a value that becomes smaller as the accelerator pedal position becomes greater. FIG. 5 shows one exemplary second limit oil pressure map that defines the relationship between the accelerator pedal position and the second limit oil pressure PL2. The second limit oil pressure map is structured to form part of the limit oil pressure map 45 stored in the memory 41. By setting the second limit oil pressure PL2 in this manner, in a accelerator pedal light depression position state, the release-side oil pressure is kept at an oil pressure equal to or greater than the stroke end pressure Pse for the entire shifting phase TP. The second limit oil pressure map shown in FIG. 5 is merely an example, and can be modified as appropriate in consideration of the vehicle characteristics and the like.

The first limit oil pressure PL1 and the second limit oil pressure PL2 determined by the limit oil pressure determining section 39 are provided to the release-side oil pressure control section 37. In the present embodiment, as will be described later, the release-side oil pressure control section 37 controls the release-side oil pressure at each time point in the shifting phase TP in the state where greater one of the first limit oil pressure PL1 and the second limit oil pressure PL2 is restricted to be the lower limit value of the release-side oil pressure.

Details of Shifting Control

Next, a description will be given of details of the shifting control according to the present embodiment, i.e., details of supplied oil pressure control for the engage-side element and the release-side element. The shifting control according to the present embodiment is characterized in that, when the vehicle state satisfies a prescribed special shifting control transition condition, the release-side oil pressure on the release-side element is reduced such that the release-side element slips, and such a slipping state of the release-side element is kept for the entire shifting phase TP. It is also characterized in that the engage-side oil pressure on the engage-side element is varied so as to vary the actual rotation speed of the intermediate shaft M appropriately, in accordance with the keeping of the release-side element in the slipping state for the entire shifting phase TP. The detailed description is given in the following.

The switching control section 36 exerts shifting control by switching between the regular shifting control and the special shifting control, depending on whether or not the vehicle state satisfies a prescribed special shifting control transition condition. Specifically, the switching control section 36 basically exerts the regular shifting control, and if the vehicle state satisfies the prescribed special shifting control transition condition, the switching control section 36 exerts the special shifting control. Here, the special shifting control transition condition is a condition related to the accelerator pedal position and the switching direction of the shift speed in the speed change mechanism 14. Specifically, what is set as the special shifting control transition condition is the event where the accelerator pedal position detected by the accelerator pedal position detecting sensor Se4 is equal to or smaller than a prescribed value, i.e., in the accelerator pedal light depression position state, and where the target shift speed in the speed change mechanism 14 is switched from a shift speed with a greater gear ratio to a shift speed with a smaller gear ratio (i.e., upshifted).

Regular Shifting Control

Figure 12:
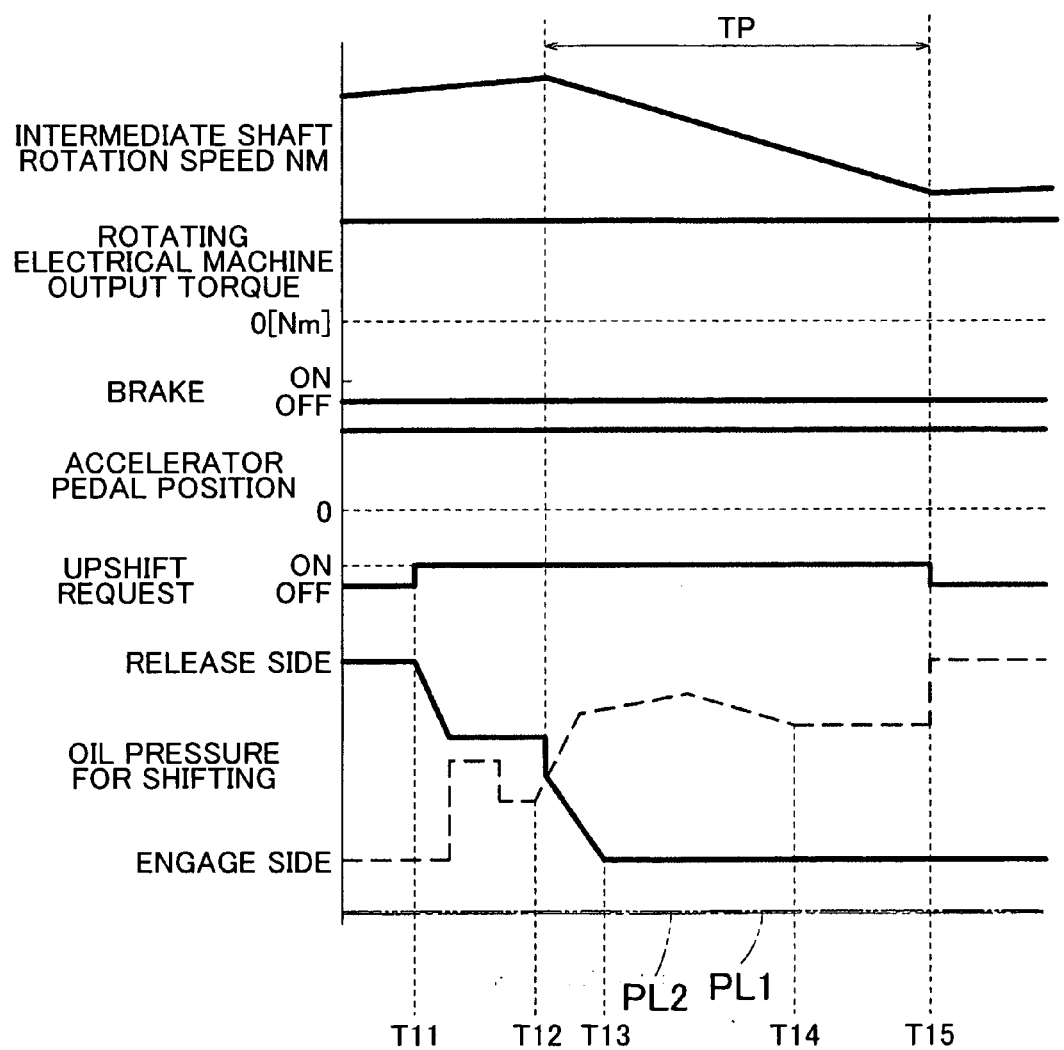
FIG. 12 is a timing diagram for describing an exemplary regular shifting control process according to the present embodiment.

When the special shifting control transition condition is not satisfied, i.e., when the accelerator pedal position is greater than a prescribed value or when a target shift speed in the speed change mechanism 14 is switched from a shift speed with a smaller gear ratio to a shift speed with a greater gear ratio (i.e., downshifted), the regular shifting control is exerted. In the regular shifting control, as shown in FIG. 12, at the initial stage in the shifting phase TP, the release-side element is swiftly released, and the engage-side element is fully engaged through a slipping state. In other words, when the shifting phase TP starts, the release-side oil pressure control section 37 exerts control so as to rapidly reduce the release-side oil pressure, thereby swiftly releasing the release-side element. The engage-side oil pressure control section 38 exerts control so as to preliminarily fill an oil chamber of the engage-side element with the hydraulic oil, and thereafter to vary the engage-side oil pressure so as to vary the rotation speed of the intermediate shaft M at prescribed target rotation acceleration AT. The target rotation acceleration of the intermediate shaft M is determined based on a target shifting time required for switching between the shift speeds, and on a rotation speed variation width of the intermediate shaft M in connection with the states before and after the shift speed switching.

Special Shifting Control

On the other hand, when the special shifting control transition condition is satisfied, the special shifting control specific to the present application is exerted. In the special shifting control, release-side special shifting control, which is the control of the release-side oil pressure on the release-side element, and engage-side special shifting control, which is the control of the engage-side oil pressure on the engage-side element, are both exerted. The release-side special shifting control causes the release-side element to be kept in a slipping state for the entire shifting phase TP. In the present embodiment, the release-side special shifting control is exerted through control steps, namely, standby control, variation rate control, rotation speed control, and release control. Each of such control, i.e., the standby control, the variation rate control, the rotation speed control, and the release control is exerted by the release-side oil pressure control section 37 over the release-side oil pressure. On the other hand, the engage-side special shifting control causes the engage-side oil pressure to vary so as to cause the actual rotation speed of the intermediate shaft M to appropriately vary for the entire shifting phase TP. In the present embodiment, the engage-side special shifting control is exerted through control steps, namely, first engagement control and second engagement control. Each of the first engagement control and the second engagement control is exerted by the engage-side oil pressure control section 38 over the engage-side oil pressure.

Figure 7:
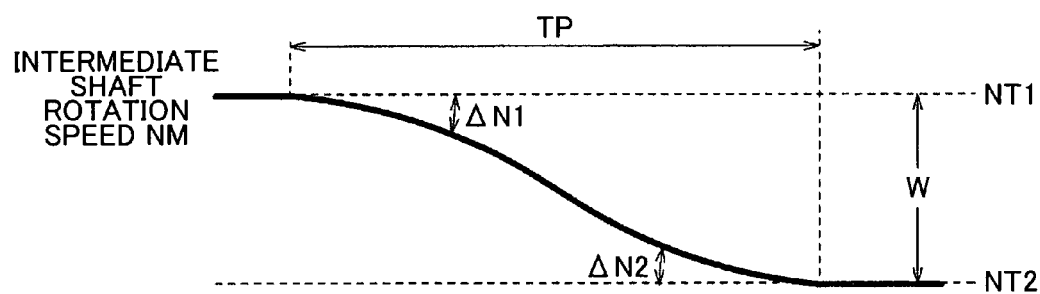
FIG. 7 is an explanatory diagram for describing a shifting phase according to the present embodiment.

Here, the shifting phase TP (see FIG. 7 and others) is a transition of the rotation speed of the intermediate shaft M serving as an input shaft of the transmission apparatus 2, from a pre-switch target rotation speed NT1 that is a target rotation speed NT before shift speed switching to a post-switch target rotation speed NT2 that is a target rotation speed NT after shift speed switching. In the present embodiment, the shifting phase TP is set to be a period from a time point when a rotation speed difference $\Delta N1$ before shift speed switching that is acquired by the rotation difference acquiring section 35 becomes equal to or greater than a prescribed value, to another time point when a rotation speed difference $\Delta N2$ after shift speed switching that is acquired by the rotation difference acquiring section 35 becomes equal to or smaller than a prescribed value. In this case, the prescribed value is set to a value that makes it possible to discern a deviation of the actual rotation speed of the intermediate shaft M from the target rotation speeds NT1 and NT2 respectively before and after shift speed switching. Accordingly, in the present embodiment, the shifting phase TP corresponds to a period from a time point when the release-side element starts to slip, to another time point when a rotation speed difference between a rotation speed, which is obtained by multiplying a rotation speed of the output shaft O by a gear ratio after shift speed switching, and the rotation speed of the intermediate shaft M becomes equal to or smaller than a prescribed value, i.e., where the rotation speeds synchronize with each other. Further, the shifting phase TP corresponds to a period from a time point when the release-side element starts to slip to another time point when engagement members on the opposite sides of the engage-side element (i.e., an input side rotary member and an output side rotary member) synchronize with each other. In this case, if the engage-side element is structured with a brake, then one of the input side rotary member and the output side rotary member is a non-rotary member (for example, a case, which is not shown). Accordingly, the end point of the shifting phase TP corresponds to a time point when the rotation speed of the other rotary member becomes substantially zero.

Release-Side Special Shifting Control

In the release-side special shifting control, first, the standby control is exerted before entering the shifting phase TP. In the standby control, when an upshift of the target shift speed is requested based on an accelerator pedal position of the vehicle and a vehicle speed, the release-side oil pressure control section 37 keeps the release-side oil pressure at a holding pressure that is commensurate with output torque, until a prescribed time has elapsed. This standby time is monitored by an internal timer.

When the prescribed time has elapsed since the upshift request, the variation rate control is exerted. The variation rate control is exerted at an initial stage in the shifting phase TP, and the release-side oil pressure control section 37 reduces the release-side oil pressure at a variation rate commensurate with the magnitude of the output torque of the rotating electrical machine 12. Further, in the present embodiment, in a case where the rotating electrical machine 12 outputs negative torque (regenerative torque), the absolute value of the variation rate in reducing the release-side oil pressure is set to be smaller as the output torque is smaller (as the regenerative torque is greater), whereas the absolute value of the variation rate in reducing the release-side oil pressure is set to be greater as the output torque is greater (as the regenerative torque is smaller). The absolute value of the variation rate in reducing the release-side oil pressure in this phase is set to a value sufficiently smaller than the absolute value of the variation rate in the regular shifting control, and the release-side oil pressure is reduced slowly. During this period, the release-side element is kept in a semi-engaged state where it is not fully engaged nor released. Thus, while the engagement members on the opposite sides of the release-side element (i.e., the input side rotary member and the output side rotary member) are kept in a slipping state where the engagement members have a prescribed rotation speed difference between each other, driving force is transferred between the input side rotary member and the output side rotary member of the release-side element.

Under the variation rate control, the release-side oil pressure control section 37 controls the release-side oil pressure such that the engagement pressure of the release-side element becomes equal to or greater than a prescribed value. In the present embodiment, a lower limit value is set for the release-side oil pressure when under the variation rate control, such that the engagement pressure of the release-side element becomes equal to or greater than the prescribed value. Specifically, the greater one of the two limit oil pressures (the first limit oil pressure PL1 and the second limit oil pressure PL2) determined by the limit oil pressure determining section 39 is set as the lower limit value for the release-side oil pressure. In this manner, the release-side oil pressure when under the variation rate control is kept at a pressure that is equal to or greater than the first limit oil pressure PL1 and equal to or greater than the second limit oil pressure PL2. In the present embodiment, as in the foregoing, in the accelerator pedal light depression position state where the special shifting control is to be exerted, the second limit oil pressure PL2 is set to be a value equal to or greater than the stroke end pressure Pse of the release-side element. Accordingly, in the present embodiment, under the special shifting control, the release-side element is caused to be in the semi-engaged state and is kept in the slipping state. Further, in the present embodiment, as in the foregoing, the first limit oil pressure PL1 is set to a value that becomes greater as the output torque of the rotating electrical machine 12 becomes greater in the negative direction (i.e., as the regenerative torque becomes greater). Accordingly, in the present embodiment, the release-side oil pressure when under the special shifting control is basically kept equal to or greater than the second limit oil pressure PL2, and it is kept equal to or greater than the first limit oil pressure PL1 if the first limit oil pressure PL1 becomes greater than the second limit oil pressure PL2 in accordance with the magnitude of the regenerative torque (negative torque) output from the rotating electrical machine 12.

The switching control section 36 monitors a degree of progress $\alpha$ of a shifting operation in a shifting phase TP for the entire shifting phase TP. The degree of progress $\alpha$ is an index representing how far the shift speed switching has progressed in the shifting phase TP. In the present embodiment, the degree of progress $\alpha$ is derived as a proportion of a difference between a pre-switch target rotation speed NT1 of the intermediate shaft M and an actual rotation speed NM of the intermediate shaft M during a shift operation against a difference (rotation speed variation width W) between the pre-switch target rotation speed NT1 of the intermediate shaft M and a post-switch target rotation speed NT2 of the intermediate shaft M. The target rotation speeds NT1 and NT2 of the intermediate shaft M1 respectively before and after shift speed switching are derived, as described above, by multiplying an actual rotation speed NO of the output shaft O detected by the vehicle speed sensor Se3 by a gear ratio of each shift speed in the speed change mechanism 14. The actual rotation speed NM of the intermediate shaft M is detected by the intermediate shaft rotation speed sensor Se2. Accordingly, the degree of progress α is derived based on the actual rotation speed NM of the intermediate shaft M detected by the intermediate shaft rotation speed sensor Se2, the actual rotation speed NO of the output shaft O detected by the vehicle speed sensor Se3, and the gear ratio of each of shift speeds before and after shift speed switching.

In so far as the special shifting control transition condition is satisfied, the variation rate control is exerted until a switching point is reached. Here, the switching point is a time point when the degree of progress α reaches a prescribed proportion. In the present embodiment, in so far as the special shifting control transition condition is satisfied, the switching point is another time point when a shifting operation has progressed by 50% (i.e., the degree of progress α has become 0.5), and the variation rate control is exerted until the switching point. Here, it is structured such that whether or not the special shifting control transition condition is satisfied is determined based on, as described above, the accelerator pedal position detected by the accelerator pedal position detecting sensor Se4 and the switching direction of the target shift speed in the speed change mechanism 14. In other words, in a situation where the accelerator pedal position is equal to or smaller than a prescribed value, i.e., in the accelerator pedal light depression position state, and where the target shift speed in the speed change mechanism 14 is switched from a shift speed with a greater gear ratio to a shift speed with a smaller gear ratio (i.e., upshifted), it is determined that the special shifting control transition condition is satisfied. Otherwise, it is determined that the special shifting control transition condition is not satisfied.

In a state where the special shifting control transition condition is satisfied, when the shifting operation has progressed by 50% (i.e., the degree of progress α has become 0.5) to reach the switching point, subsequently, the rotation speed control is exerted. In the rotation speed control, the release-side oil pressure control section 37 causes the release-side oil pressure to vary, such that the rotation speed NM of the intermediate shaft M meets the target rotation speed NT at each time point in the shifting phase TP. In the present embodiment, it is assumed that a target shifting time (herein denoted as Tt) that represents a target required time for switching between shift speeds is preset, and that a shifting operation ends after a lapse of the target shifting time Tt since the start of the shifting operation. The target shifting time Tt has been stored in the memory 41 as the target shifting time data 44. Thus, the target rotation speed NT of the intermediate shaft M at each time point is determined based on the target shifting time Tt and the rotation speed variation width W that is a difference between the rotation speeds of the intermediate shaft M respectively before and after shift speed switching. Here, the target rotation speed NT at each time point in the shifting phase TP is set so as to plot a time course that causes little vehicle behavior change when a shift speed is switched. More specifically, the target rotation speed NT at each time point in the shifting phase TP is set so as to plot a time course along which the absolute value of the temporal variation rate of the target rotation speed NT becomes smaller toward the terminal phase of the shifting phase TP. In the present embodiment, the target rotation speed NT at each time point is set so as to plot a time course that represents, in the form of a quadratic curve, the rotation speeds of the intermediate shaft M from the time point when the rotation speed control starts until the time point when the shifting operation completes.

Figure 8:
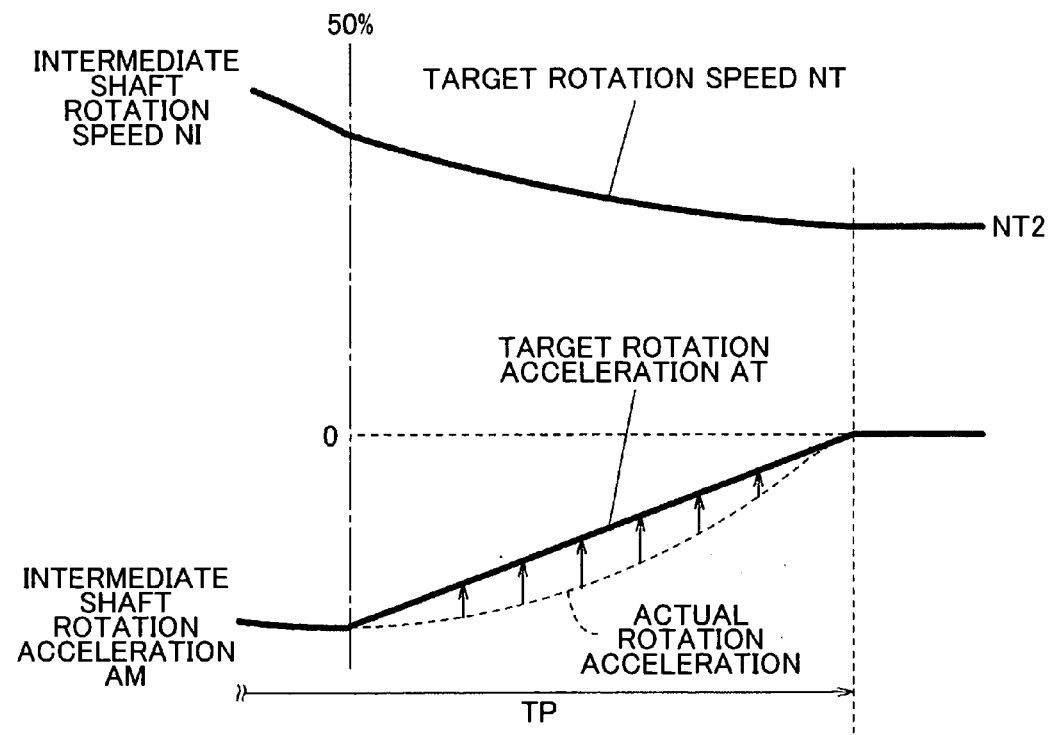
FIG. 8 is an explanatory diagram for describing a control method of a release-side oil pressure under rotation speed control.

In the present embodiment, from the target rotation speed NT at each time point set as in the foregoing, the target rotation acceleration AT (target rotation speed variation rate) at each time point is derived. Because the target rotation speed NT at each time point is set to plot a time course represented by a quadratic curve in the present embodiment, the target rotation acceleration AT at each time point is set such that the absolute value thereof becomes linearly smaller toward the end point of the shifting operation and ultimately reaches zero. The target rotation acceleration AT at each time point may be set further taking into account the acceleration of the vehicle. The release-side oil pressure control section 37 varies the release-side oil pressure such that the actual rotation acceleration AM of the intermediate shaft M acquired by the rotation acceleration acquiring section 34 follows the target rotation acceleration AT at each time point. In other words, as shown in FIG. 8, the release-side oil pressure control section 37 compares the target rotation acceleration AT at each time point with the actual rotation acceleration AM of the intermediate shaft M. When there is a deviation from the target, the release-side oil pressure control section 37 varies the release-side oil pressure such that the actual rotation acceleration AM of the intermediate shaft M varies in the direction to cancel the deviation. In this manner, at the latter half stage in the shifting phase TP, the rotation speed NM of the intermediate shaft M can smoothly be shifted to the post-switch target rotation speed NT2. During this period, as in the foregoing description, the release-side element is kept in the semi-engaged state where it is not fully engaged nor released, and kept in the slipping state.

In so far as the special shifting control transition condition is satisfied, the rotation speed control is exerted until a rotation speed difference ΔN2 between the post-switch target rotation speed NT2 and the actual rotation speed NM of the intermediate shaft M, which is acquired by the rotation difference acquiring section 35, becomes equal to or smaller than a prescribed value. In the present embodiment, as the prescribed value herein, a value that is equal to a reference value for determining the end of the shifting phase TP is set. Accordingly, in the present embodiment, the timing of ending the rotation speed control and the timing of ending the shifting phase TP are the same.

In the event where the special shifting control transition condition fails to be satisfied while under the variation rate control or the rotation speed control, or where the rotation speed difference ΔN2 after shift speed switching acquired by the rotation difference acquiring section 35 becomes equal to or smaller than a prescribed value, the release control is then exerted. In the release control, the release-side oil pressure control section 37 reduces the release-side oil pressure at a variation rate equal to that of the release-side oil pressure in the regular shifting control so that the release-side oil pressure quickly reaches the value zero. In this manner, the release-side element is fully released swiftly.

Engage-Side Special Shifting Control

In the engage-side special shifting control, the engage-side oil pressure control section 38 firstly determines a reference oil pressure variation amount ΔPb to be a reference for varying the engage-side oil pressure before entering the shifting phase TP. Here, the reference oil pressure variation amount ΔPb is an oil pressure variation amount required for varying the rotation speed of the intermediate shaft M at prescribed target rotation acceleration AT. The reference oil pressure variation amount ΔPb is derived as a product of the target rotation acceleration AT and a prescribed coefficient. Here, the target rotation acceleration AT of the intermediate shaft M is determined based on the pre-set target shifting time (herein denoted as Tt) that represents a target required time for switching between shift speeds, as in the foregoing description, and the rotation speed variation width W that is a difference between the rotation speeds of the intermediate shaft M respectively before and after the shift speed switching. In other words, the target rotation acceleration AT of the intermediate shaft M is derived as a quotient obtained by dividing the rotation speed variation width W by the target shifting time Tt. Accordingly, the reference oil pressure variation amount ΔPb is also determined based on the target shifting time Tt and the rotation speed variation width W.

Figure 6:
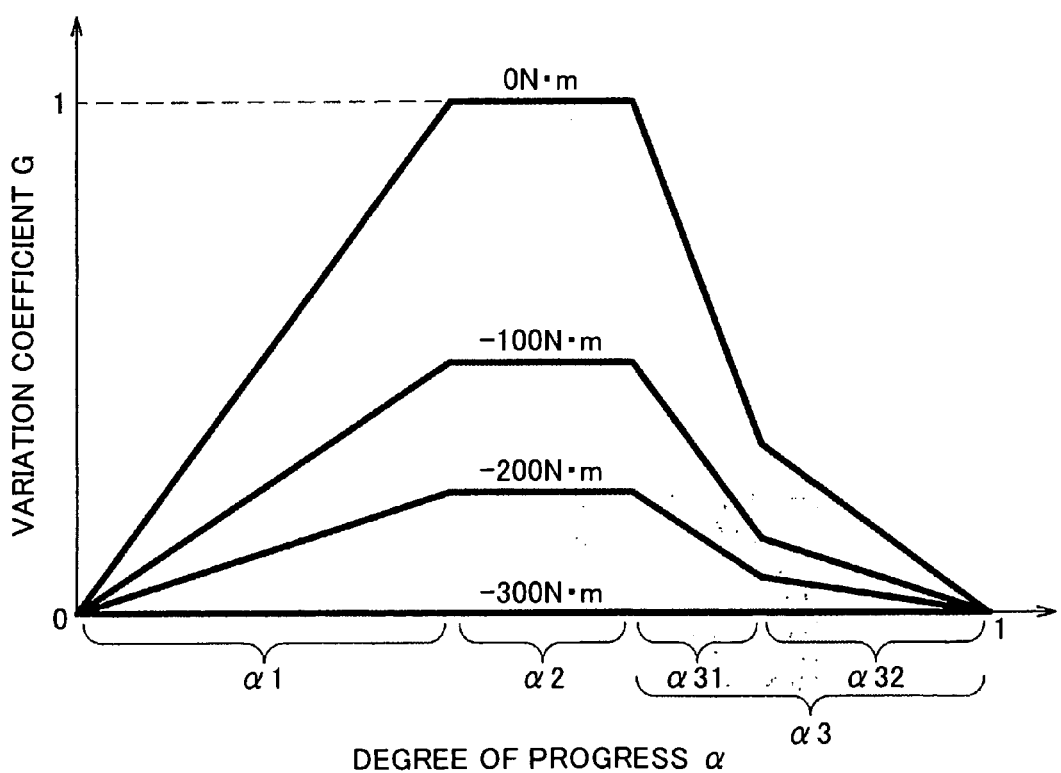
FIG. 6 shows an exemplary variation coefficient map according to the present embodiment.

Based on the derived target rotation acceleration AT, the engage-side oil pressure control section 38 exerts the first engagement control so as to vary the pressure of hydraulic oil on the engage-side element (engage-side oil pressure) such that the actual rotation acceleration AM of the intermediate shaft M follows the target rotation acceleration AT. In order to exert such first engagement control, in the present embodiment, the engage-side oil pressure control section 38 is structured to vary the engage-side oil pressure, using the engage-side oil pressure at the start of the shifting phase TP as the reference, and based on a prescribed variation coefficient G that is preset in accordance with the degree of progress α of the shifting phase TP and the output torque of the rotating electrical machine 12, and on the reference oil pressure variation amount ΔPb. FIG. 6 shows one exemplary variation coefficient map 46 that defines the relationship between the degree of progress α in the shifting phase TP as well as the output torque of the rotating electrical machine 12 and the variation coefficient G. In the map shown in FIG. 6, the horizontal axis and the vertical axis represent the degree of progress α and the variation coefficient G, respectively. Also shown are a plurality of line plots representing the relationship between the degree of progress α and the variation coefficient G for each of a plurality of (four in the present embodiment) representative values related to the output torque of the rotating electrical machine 12. The shifting phase TP is partitioned into a plurality of stages that are set in accordance with the degree of progress α (in the present embodiment, three stages, namely, a first stage α1, a second stage α2, and a third stage α3).

As shown in FIG. 6, under the condition that the output torque of the rotating electrical machine 12 is kept at a constant value for the entire shifting phase TP, the variation coefficient G is set at a value that becomes greater in accordance with the progress of the shifting phase TP at the first stage α1 being the first stage in the shifting phase TP, and becomes smaller in accordance with the progress of the shifting phase TP at the third stage α3 being the final stage in the shifting phase TP. Here, the first stage α1 is a stage where the degree of progress α of the shifting phase TP is equal to or smaller than a prescribed value. In the present embodiment, the period where 0≤α≤0.4 is defined as the first stage α1. The third stage α3 is a stage where the degree of progress α of the shifting phase TP is equal to or greater than a prescribed value. In the present embodiment, the period where 0.6≤α≤1 is defined as the third stage α3. In the present embodiment, at the second stage α2 which is a period where 0.4<α<0.6 between the first stage α1 and the third stage α3, the variation coefficient G is set to a value that is constant independently of the degree of progress α of the shifting phase TP. As can be seen from the map shown in FIG. 6, at the third stage α3, the variation rate (herein, decreasing rate) of the variation coefficient G relative to the degree of progress α is greater in an earlier half portion α31 of the third stage α3 than in a latter half portion α32. Further, the absolute value of the variation rate (herein, increasing rate) of the variation coefficient G relative to the degree of progress α at the first stage α1 is smaller than the absolute value of the variation rate (herein, decreasing rate) of the variation coefficient G in the earlier half portion α31 of the third stage α3, and is greater than the absolute value of the variation rate (herein, decreasing rate) of the variation coefficient G in the latter half portion α32 of the third stage α3.

Further, under the condition that the degree of progress α of the shifting phase TP is equal, when the output torque of the rotating electrical machine 12 is negative, the variation coefficient G is set to a value that becomes greater in accordance with the variation of the output torque of the rotating electrical machine 12 in the positive direction (i.e., becoming smaller in accordance with the variation of the output torque of the rotating electrical machine 12 in the negative direction). In the present embodiment, by using a state where the output torque of the rotating electrical machine 12 is zero, i.e., where neither motive power nor electric power is generated, as a reference (G=1), the variation coefficient G is set to a value that gradually becomes smaller in accordance with an increase in the negative torque (regenerative torque) output from the rotating electrical machine 12, and that is always zero independently of the degree of progress α if the absolute value of the torque is equal to or greater than a prescribed value (in the drawing, 300 [N·m] as the regenerative torque). While FIG. 6 shows only the relationship where the output torque of the rotating electrical machine 12 is negative (including a case where the output torque is zero), the relationship where the output torque of the rotating electrical machine 12 is positive is the same as the relationship where the output torque of the rotating electrical machine 12 is zero, in the present embodiment. Further, while the FIG. 6 shows only the relationship as to the four representative values related to the output torque of the rotating electrical machine 12, it may be structured to define the relationship as to more than four output torque values. The variation coefficient map shown in FIG. 6 is merely an example and can be modified as appropriate in consideration of the vehicle characteristics and the like.

By using the engage-side oil pressure at the start of the shifting phase TP as the reference, the engage-side oil pressure control section 38 varies the engage-side oil pressure based on the variation coefficient G, which is determined by the degree of progress α of the shifting phase TP and the output torque of the rotating electrical machine 12, and on the reference oil pressure variation amount ΔPb. In other words, in the present embodiment, a product obtained by multiplying the reference oil pressure variation amount ΔPb by the variation coefficient G is derived as a variation amount of the engage-side oil pressure that is commensurate with the degree of progress α of the shifting phase TP and the output torque of the rotating electrical machine 12. By adding the derived value to the engage-side oil pressure at the start of the shifting phase TP, a command value of the engage-side oil pressure at each time point in the shifting phase TP is determined. The engage-side oil pressure control section 38 varies the actual engage-side oil pressure so as to follow the command value of the engage-side oil pressure. Thus, the variation in the engage-side oil pressure is based on the reference oil pressure variation amount ΔPb and commensurate with the degree of progress α of the shifting phase TP and the output torque of the rotating electrical machine 12. Specifically, the engage-side oil pressure varies with a greater variation width as the absolute value of the negative torque (regenerative torque) output from the rotating electrical machine 12 is smaller, and in a manner where the engage-side oil pressure increases, stays constant, decreases, and moderately decreases in accordance with the progress of the shifting phase TP. The engage-side oil pressure at the start of the shifting phase TP is a pressure immediately before starting engagement where a slight increase in the engage-side oil pressure swiftly causes the engage-side element to be engaged. The first engagement control is exerted in synchronization with a reduction in the release-side oil pressure caused by the release-side special shifting control.

In so far as the special shifting control transition condition is satisfied, the first engagement control is exerted until the rotation speed difference ΔN2 between the post-switch target rotation speed NT2 and the actual rotation speed NM of the intermediate shaft M acquired by the rotation difference acquiring section 35 becomes equal to or smaller than a prescribed value. In the present embodiment, as the prescribed value herein, a value that is equal to the reference value for determining the end of the rotation speed control and the reference value for determining the end of the shifting phase TP is set. Accordingly, in the present embodiment, the timing of ending the first engagement control and the timing of ending the rotation speed control as well as the shifting phase TP are the same.

When the rotation speed difference ΔN2 after switching shift speed acquired by the rotation difference acquiring section 35 becomes equal to or smaller than the prescribed value, the second engagement control is then exerted. In the second engagement control, the engage-side oil pressure control section 38 controls the engage-side oil pressure so as to cause the engage-side element to enter a fully engaged state, after the rotation speed difference ΔN2 becomes equal to or smaller than the prescribed value and the shifting phase TP ends. In the present embodiment, after the shifting phase TP ends, the engage-side oil pressure control section 38 causes the engage-side oil pressure to jump straight to the full engagement pressure.

Procedure of Shifting Control Process

Figure 9:
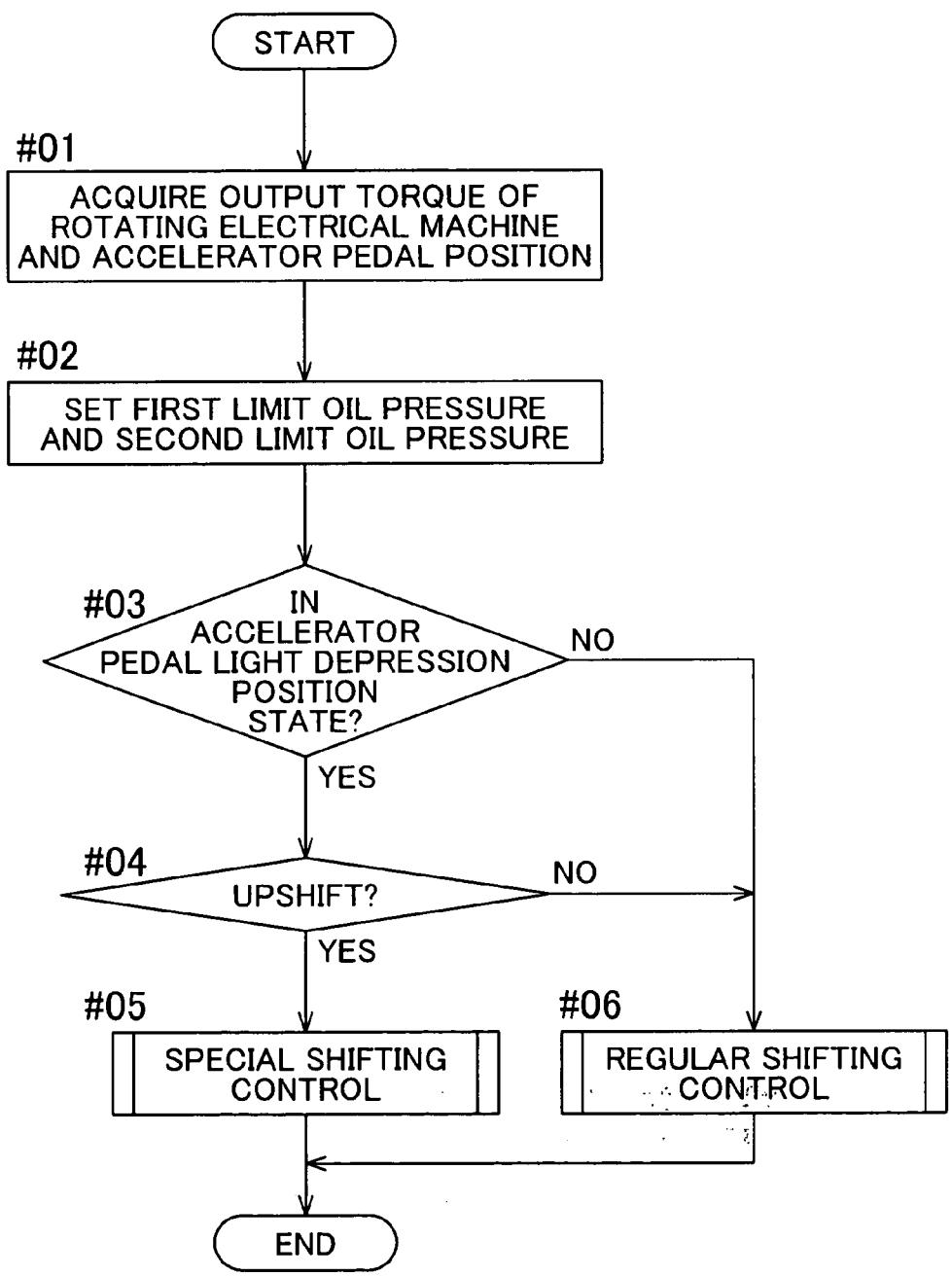
FIG. 9 is a flowchart showing the entire processing procedure of a shifting control process according to the present embodiment.
Figure 10:
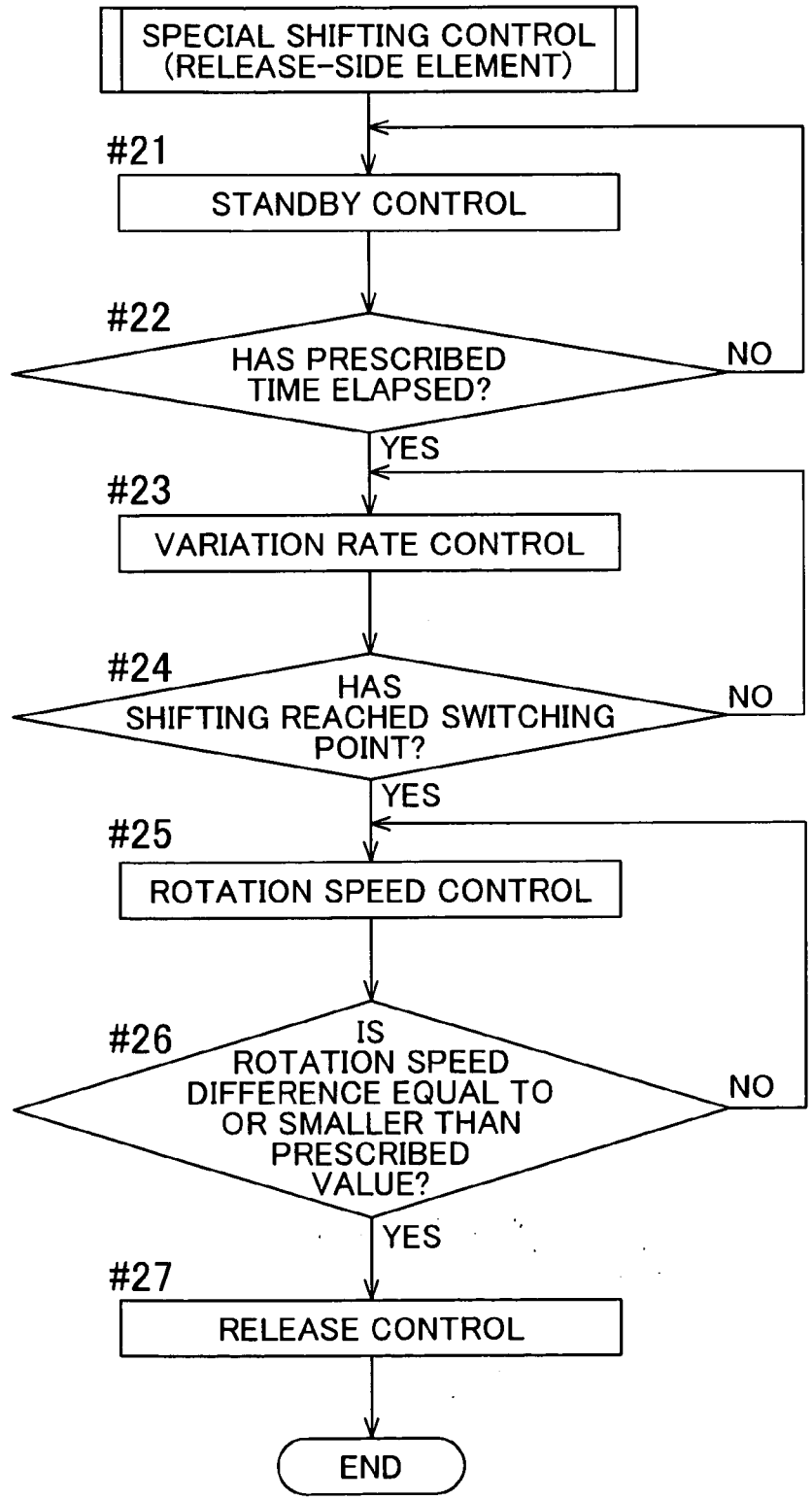
FIG. 10 is a flowchart showing the processing procedure of a release-side special shifting control process according to the present embodiment.
Figure 11:
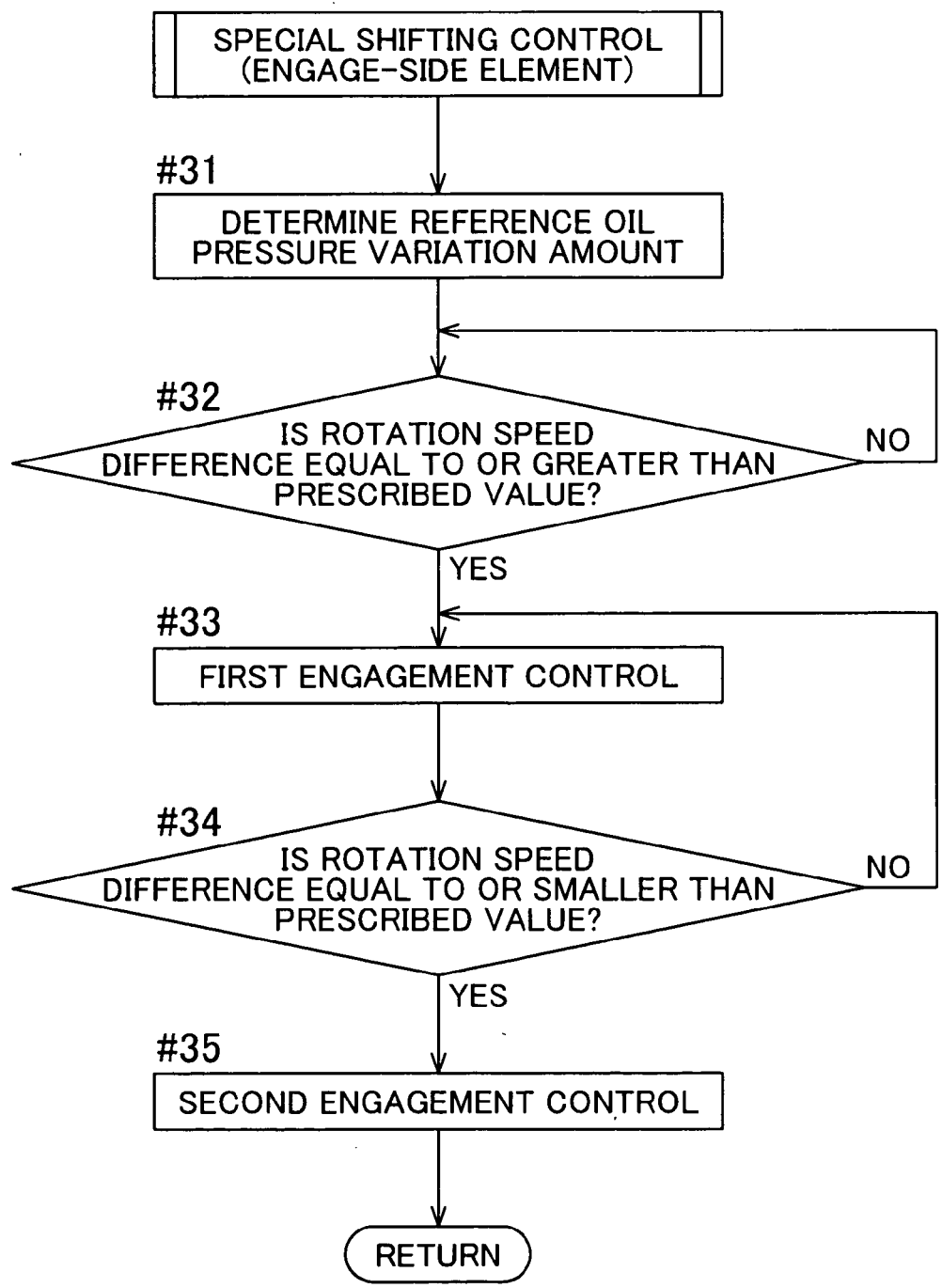
FIG. 11 is a flowchart showing the processing procedure of an engage-side special shifting control process according to the present embodiment.

Next, a description will be given of the contents of the control of the vehicular driving apparatus 1 that includes the transmission apparatus 2 according to the present embodiment. FIG. 9 is a flowchart showing the entire processing procedure of the shifting control process of the vehicular driving apparatus 1 according to the present embodiment. FIG. 10 is a flowchart showing the processing procedure of the release-side special shifting control process that is the special shifting control process related to the release-side element, which is included in the special shifting control process appearing in step #05 shown in FIG. 9. FIG. 11 is a flowchart showing the processing procedure of the engage-side special shifting control process that is the special shifting control process related to the engage-side element, which is included in the special shifting control process appearing in step #05 shown in FIG. 9. The procedure of the shifting control process of the vehicular driving apparatus 1 described in the following is executed by the functional sections 32 to 39 in the control unit 31. When the functional sections 32 to 39 in the control unit 31 are structured with a program, the computing apparatus included in the control unit 31 operates as a computer that executes the program structuring the functional sections 32 to 39.

Overall Procedure of Shifting Control Process

In the shifting control process according to the present embodiment, first, the output torque of the rotating electrical machine 12 and the accelerator pedal position are acquired (step #01). In the present embodiment, the output torque of the rotating electrical machine 12 is acquired as a torque command value determined by the rotating electrical machine control section 33, and the accelerator pedal position is acquired as being detected by the accelerator pedal position detecting sensor Se4. The limit oil pressure determining section 39 determines the first limit oil pressure PL1 that is commensurate with the output torque of the rotating electrical machine 12, based on the acquired output torque of the rotating electrical machine 12, and determines the second limit oil pressure PL2 that is commensurate with the accelerator pedal position, based on the acquired accelerator pedal position (step #02). Next, whether or not the vehicle state satisfies the special shifting control transition condition is determined. Specifically, it is determined whether or not the accelerator pedal light depression position state is established (step #03), and whether or not an upshift request to the target shift speed in the speed change mechanism 14 is made (step #04). In the present embodiment, when the accelerator pedal position detecting sensor Se4 determines that the accelerator pedal position is equal to or smaller than a prescribed value (in the present embodiment, 1%), it is determined that the accelerator pedal light depression position state is established.

When it is determined that the accelerator pedal light depression position state is established (step #03: Yes) and also determined that an upshift request to the target shift speed has been made (step #04: Yes), the switching control section 36 exerts the special shifting control (step #05). The details of the processing procedure of the special shifting control will be described later. On the other hand, when it is determined that the accelerator pedal light depression position state is established (step #03: No), or when it is determined that an upshift request to the target shift speed has not been made (step #04: No), the switching control section 36 exerts the regular shifting control (step #06). Under the regular shifting control, at an initial stage in the shifting phase TP, the release-side element is swiftly released and the engage-side element is fully engaged through a slipping state. Steps #01 to #06 are repeatedly executed in order during traveling of the vehicle.

Entire Procedure of Special Shifting Control Process

Next, a description will be given of the details of the processing procedure of the special shifting control process in step #05. The special shifting control process is structured to include the release-side special shifting control process related to the release-side element, and the engage-side special shifting control process related to the engage-side element. In the release-side special shifting control process as shown in FIG. 10, the standby control is firstly exerted (step #21). Under the standby control, the release-side oil pressure is kept at a holding pressure that is commensurate with output torque until a prescribed time elapses. When it is determined that the prescribed time has elapsed based on the internal timer (step #22: Yes), the variation rate control is then exerted (step #23). Under the variation rate control, the release-side oil pressure is reduced at a variation rate that is commensurate with the magnitude of the output torque of the rotating electrical machine 12. The variation rate control is continuously exerted in so far as the special shifting control transition condition is satisfied, and in parallel therewith, whether or not the shifting phase TP has reached the switching point is determined (step #24). In the present embodiment, it is assumed that a time point when the shifting operation has progressed by 50% (the time point when the degree of progress α has reached 0.5) is the switching point.

Until the switching point is reached (step #24: No), the variation rate control is continuously exerted. When the degree of progress of the shifting operation has progressed by 50% and it is determined that the switching point is reached (step #24: Yes), subsequently, the rotation speed control is exerted (step #25). Under the rotation speed control, the release-side oil pressure is varied such that the actual rotation acceleration AM of the intermediate shaft M serving as the input shaft of the transmission apparatus 2 follows the target rotation acceleration AT at each time point. The rotation speed control is continuously exerted in so far as the special shifting control transition condition is satisfied, and in parallel therewith, it is determined whether or not the rotation speed difference ΔN2 is equal to or smaller than a prescribed value (step #26). As the prescribed value herein, in the present embodiment, such a value is set that makes it possible to discern a deviation of the actual rotation speed of the intermediate shaft M from the target rotation speed NT2 after shift speed switching. During a period where the rotation speed difference ΔN2 is greater than the prescribed value (step #26: No), the rotation speed control is continuously exerted. When the rotation speed difference ΔN2 has become equal to or smaller than the prescribed value (step #26: Yes), the release control is then exerted (step #27). Under the release control, the release-side element is fully released swiftly. Although it is not shown in the flowchart of FIG. 10, the release control is exerted also when the special shifting control transition condition is no longer satisfied while the variation rate control or the rotation speed control is exerted (step #27). Thus, the release-side special shifting control process ends.

Under the engage-side special shifting control process shown in FIG. 11, first, the reference oil pressure variation amount ΔPb is determined (step #31). The reference oil pressure variation amount ΔPb is determined based on the target shifting time Tt and the rotation speed variation width W. Next, it is determined whether or not the rotation speed difference ΔN1 is equal to or greater than a prescribed value (step #32). As to the prescribed value herein, in the present embodiment, such a value is set that makes it possible to discern a deviation of the actual rotation speed of the intermediate shaft M from the target rotation speed NT1 before switching shift speed. When it is determined that the rotation speed difference ΔN1 is equal to or greater than the prescribed value (step #32: Yes), the first engagement control is then exerted (step #33). Under the first engagement control, the engage-side oil pressure is varied based on the reference oil pressure variation amount ΔPb so as to be commensurate with the degree of progress α of the shifting phase TP and the output torque of the rotating electrical machine 12. The first engagement control is continuously exerted in so far as the special shifting control transition condition is satisfied, and in parallel therewith, it is determined whether or not the rotation speed difference ΔN2 is equal to or smaller than the prescribed value (step #34).

During a period where the rotation speed difference ΔN2 is greater than the prescribed value (step #34: No), the rotation speed control is continuously exerted. When the rotation speed difference ΔN2 has become equal to or smaller than the prescribed value (step #34: Yes), the second engagement control is then exerted (step #35). Under the second engagement control, after the rotation speed difference ΔN2 has become equal to or smaller than the prescribed value and the shifting phase TP ends, the engage-side oil pressure is caused to jump straight to the full engagement pressure. Thus, the engage-side special shifting control process ends. Although it is not shown in the flowchart of FIG. 11, if the special shifting control transition condition is no longer satisfied while under the first engagement control, the engage-side special shifting control process ends, and the engage-side oil pressure control, which is included in the regular shifting control (step #06), is exerted.

Specific Examples of Shifting Control Process

Next, a description will be given of specific examples where control is exerted through the shifting control process according to the present embodiment over the vehicular driving apparatus 1 including the transmission apparatus 2, referring to FIGS. 12 to 16. In the drawings, the rotation speed NM of the intermediate shaft M, the output torque of the rotating electrical machine 12, the brake pedal operation by the driver, the accelerator pedal position, the upshift request, the release-side oil pressure, and the engage-side oil pressure are shown in descending order. The first limit oil pressure PL1 and the second limit oil pressure PL2 are shown as being overlapped with the release-side oil pressure and the engage-side oil pressure.

FIG. 12 is a timing diagram showing one example in which the shifting operation is carried out under the regular shifting control. FIG. 12 shows an example in which an upshift is performed by the speed change mechanism 14 in a state where the accelerator pedal position of the vehicle is greater than the accelerator pedal position that defines the accelerator pedal light depression position state (1% in this example). In this example, the regular shifting control is exerted because the special shifting control transition condition is not satisfied. In this example, while the accelerator pedal position is kept at a prescribed magnitude, the upshift request is turned ON at time point T11. From time points T11 to T12, the release-side oil pressure is placed at the holding pressure that is commensurate with the output torque, and the engage-side oil pressure is kept at a prescribed constant pressure after the preliminary filling is completed.

Subsequently, from time points T12 to T13, the release-side oil pressure is quickly reduced so that the release-side element is swiftly released at an initial stage in the shifting phase TP. From time points T12 to T14, the engage-side oil pressure is varied such that the rotation speed NM of the intermediate shaft M is varied at the prescribed target rotation acceleration AT. Further, at time point T15, the engage-side oil pressure is increased to the full engagement pressure so that the engage-side element enters the fully engaged state, and the shifting phase TP ends. In this example, the accelerator pedal position and the positive torque output from the rotating electrical machine 12 are kept at relatively great values, whereas the first limit oil pressure PL1 and the second limit oil pressure PL2 are set to values sufficiently smaller than the stroke end pressure Pse of the release-side element, for the entire shifting phase TP. Accordingly, the release-side oil pressure varies without being limited by the first limit oil pressure PL1 or the second limit oil pressure PL2.

Figure 13:
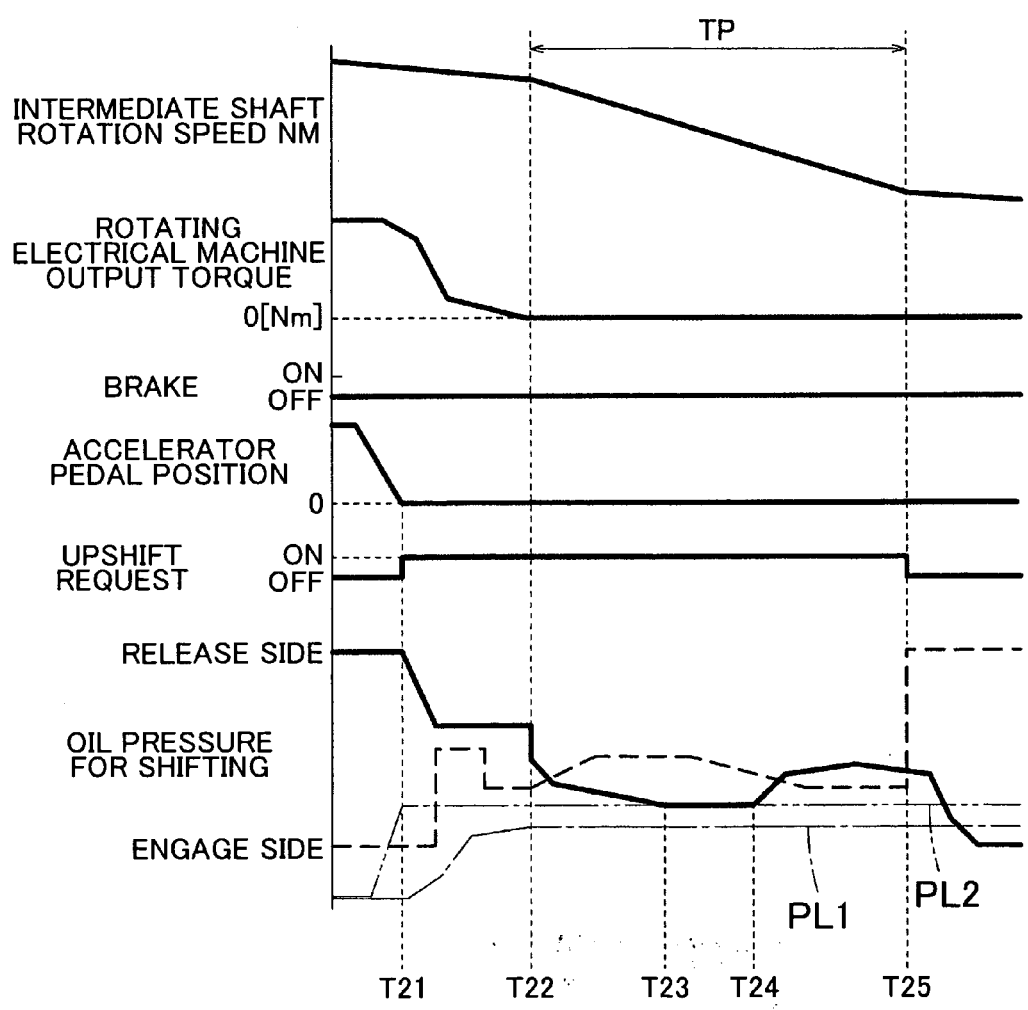
FIG. 13 is a timing diagram for describing an exemplary special shifting control process according to the present embodiment.

FIG. 13 is a timing diagram showing one example in which the shifting operation is carried out under the special shifting control. FIG. 13 shows an example in which an upshift is performed by the speed change mechanism 14 in the accelerator pedal light depression position state where the accelerator pedal position of the vehicle is equal to or smaller than the prescribed value. In this case, the special shifting control is exerted because the special shifting control transition condition is satisfied. At time point T21 where the accelerator pedal position becomes zero, the output torque of the rotating electrical machine 12 begins to gradually decrease and reaches zero at time point T22. The upshift request is turned ON at time point T21. In this example, the brake is not operated by the driver, and the output torque of the rotating electrical machine 12 is kept at zero for the entire shifting phase TP. Thus, in this exemplary case, the second limit oil pressure PL2 is greater than the first limit oil pressure PL1 and also greater than the stroke end pressure Pse of the release-side element for the entire shifting phase TP. From time points T21 to T22, the release-side oil pressure is placed at the holding pressure that is commensurate with the output torque, and the engage-side oil pressure is kept at a prescribed constant pressure after the preliminary filling is completed. Thereafter, from time points T22 to T25, the release-side oil pressure is controlled to keep the release-side element in the slipping state for the entire shifting phase TP.

More specifically, from time points T22 to T24, the variation rate control is exerted, and the release-side oil pressure is gradually reduced at a pressure-reducing variation rate that is commensurate with the magnitude of the negative torque (regenerative torque) output from the rotating electrical machine 12. At time point T23, the release-side oil pressure reaches the second limit oil pressure PL2, which is the greater one of the first limit oil pressure PL1 and the second limit oil pressure PL2; therefore, further reduction does not occur. From time points T23 to T24, the release-side oil pressure is kept at the second limit oil pressure PL2. At time point T24 where the shifting operation has progressed by 50%, i.e., at the switching point, the control is switched from the variation rate control to the rotation speed control. Under the rotation speed control, the release-side oil pressure is varied such that the actual rotation acceleration AM of the intermediate shaft M follows the target rotation acceleration AT at each time point. In the example shown in the drawing, from time points T24 to T25, the release-side oil pressure varies to increase once, and to stay at a substantially constant pressure thereafter.

For the entire shifting phase TP starting from time point T22 and ending at time point T25, the engage-side oil pressure is varied in synchronization with the variation in the release-side oil pressure such that the actual rotation acceleration AM of the intermediate shaft M follows the target rotation acceleration AT. In this example, because the output torque of the rotating electrical machine 12 is kept at zero for the entire shifting phase TP, the engage-side oil pressure varies with a relatively great variation width in a manner where the engage-side oil pressure increases, stays constant, decreases, and stays constant in accordance with the progress of the shifting phase TP. Subsequently, at time point T25 where the rotation speed difference ΔN2 becomes equal to or smaller than the prescribed value, the engage-side oil pressure is increased to the full engagement pressure, and the release-side oil pressure is then swiftly caused to reach zero, whereby the shifting phase TP ends.

Figure 14:
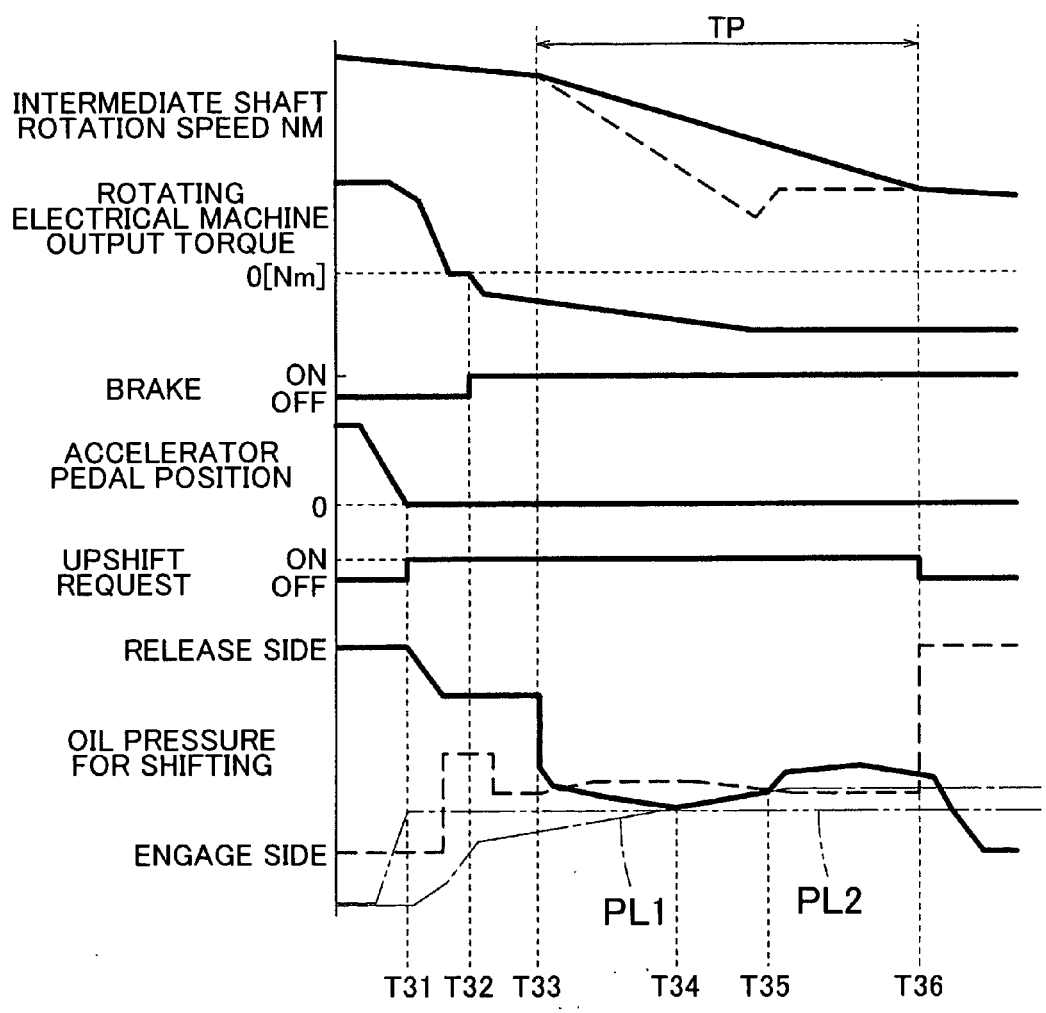
FIG. 14 is a timing diagram for describing an exemplary special shifting control process according to the present embodiment.

FIG. 14 is a timing diagram showing another example in which the shifting operation is carried out under the special shifting control. Similarly to FIG. 13, FIG. 14 shows an example in which an upshift is performed by the speed change mechanism 14 in the accelerator pedal light depression position state where the accelerator pedal position of the vehicle is equal to or smaller than the prescribed value. In this case, the special shifting control is exerted because the special shifting control transition condition is satisfied. At time point T31 where the accelerator pedal position becomes zero, the output torque of the rotating electrical machine 12 begins to gradually decrease and reaches zero at time point T32. The upshift request is turned ON at time point T31. In this example, the brake is operated by the driver at time point T32 and later. Based on the deceleration request by the brake operation, the rotating electrical machine 12 produces negative torque for the braking operation of the vehicle, and the rotating electrical machine 12 itself enters a state to regenerate. In this example, the negative torque output from the rotating electrical machine 12 gradually increases in accordance with the progress of the shifting phase TP, and therefore the first limit oil pressure PL1 also gradually increases in accordance thereto. Before time point T34, the second limit oil pressure PL2 is greater than the first limit oil pressure PL1. At time point T34 and later, the first limit oil pressure PL1 is greater than the second limit oil pressure PL2. In both cases, the first limit oil pressure PL1 and the second limit oil pressure PL2 are greater than the stroke end pressure Pse of the release-side element. From time points T31 to T33, the release-side oil pressure is placed at the holding pressure that is commensurate with the output torque, and the engage-side oil pressure is kept at a prescribed constant pressure after the preliminary filling is completed. Subsequently, from time points T33 to T36, the release-side oil pressure is controlled to keep the release-side element in the slipping state for the entire shifting phase TP.

More specifically, from time points T33 to T35, the variation rate control is exerted, and the release-side oil pressure is gradually reduced at a pressure-reducing variation rate that is commensurate with the magnitude of the negative torque (regenerative torque) output from the rotating electrical machine 12. At time point T34, the release-side oil pressure reaches the first limit oil pressure PL1 that is the greater one of the first limit oil pressure PL1 and the second limit oil pressure PL2; therefore, further reduction does not occur. From time points T34 to T35, the release-side oil pressure is kept at the first limit oil pressure PL1. As described in the foregoing, the first limit oil pressure PL1 gradually increases in accordance with the progress of the shifting phase TP, and therefore the release-side oil pressure also gradually increases in accordance thereto. At time point T35 where the shifting operation has progressed by 50%, i.e., at the switching point, the control is switched from the variation rate control to the rotation speed control. Under the rotation speed control, the release-side oil pressure is varied such that the actual rotation acceleration AM of the intermediate shaft M follows the target rotation acceleration AT at each time point. In the example shown in the drawing, from time points T35 to T36, the release-side oil pressure varies to increase once, and thereafter to stay at a substantially constant pressure.

For the entire shifting phase TP starting from time point T33 and ending at time point T36, the engage-side oil pressure is varied in synchronization with the variation in the release-side oil pressure such that the actual rotation acceleration AM of the intermediate shaft M follows the target rotation acceleration AT. In this specific example, because the rotating electrical machine 12 produces negative torque (regenerative torque) for the entire shifting phase TP, the engage-side oil pressure varies with a relatively small variation width in a manner where the engage-side oil pressure increases, stays constant, decreases, and stays constant in accordance with the progress of the shifting phase TP. In other words, as can clearly be seen from a comparison between FIGS. 13 and 14, the engage-side oil pressure varies in accordance with the progress of the shifting phase TP with the variation width that is smaller than that in the case where the output torque of the rotating electrical machine 12 is kept at zero. Subsequently, at time point T36 where the rotation speed difference ΔN2 becomes equal to or smaller than the prescribed value, the engage-side oil pressure is increased to the full engagement pressure, and the release-side oil pressure is then swiftly caused to be zero, whereby the shifting phase TP ends.

Figure 15:
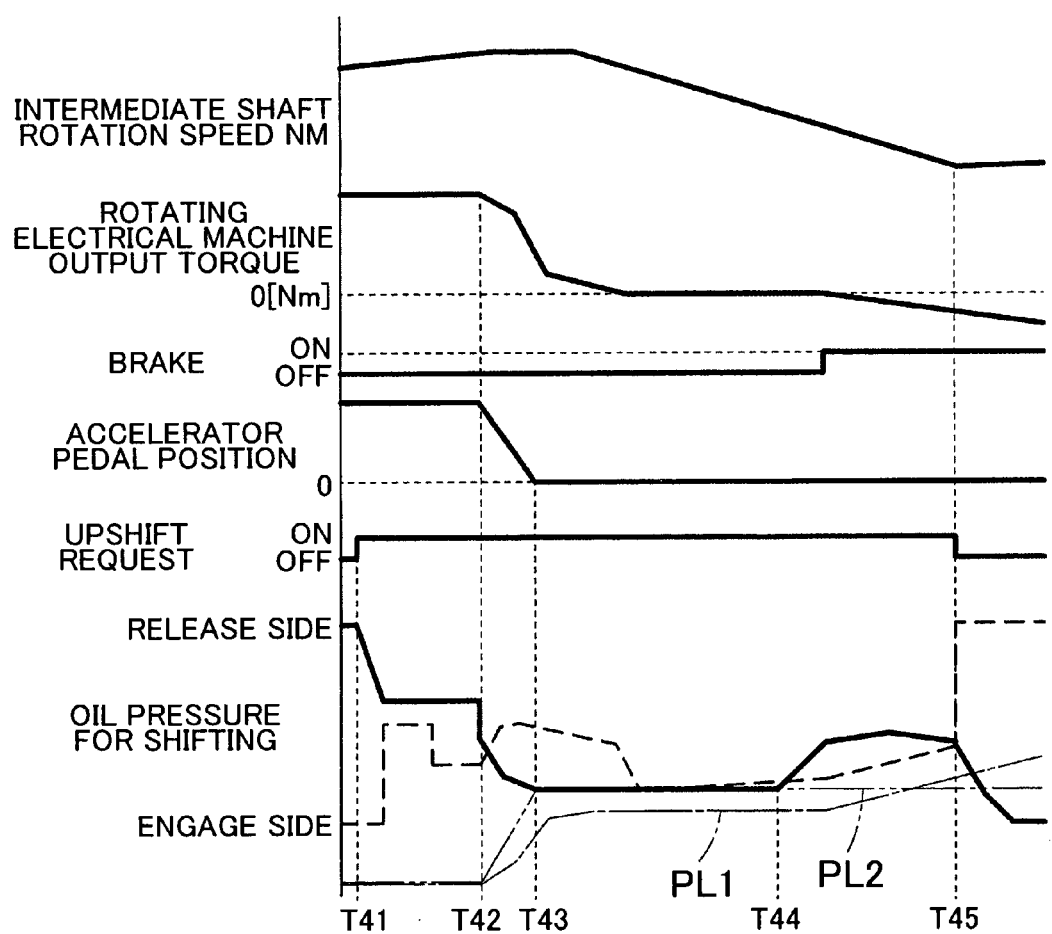
FIG. 15 is a timing diagram for describing an exemplary shifting control process according to the present embodiment.

FIG. 15 is a timing diagram showing an example in which the shifting operation is carried out under the combination of the regular shifting control and the special shifting control.

FIG. 15 shows an example in which the regular shifting control is initially exerted, and then the control is switched to the special shifting control before the post-shift target shift speed is formed. In this example, while the accelerator pedal position is kept at a prescribed magnitude, the upshift request is turned ON at time point T41. From time points T41 to T42, the release-side oil pressure is placed at the holding pressure that is commensurate with the output torque, and the engage-side oil pressure is kept at a prescribed constant pressure after the preliminary filling is completed. Subsequently, the regular shifting control is exerted so as to vary the engage-side oil pressure such that the release-side oil pressure is quickly reduced, so that the release-side element is swiftly released and that the rotation speed NM of the intermediate shaft M is varied at the prescribed target rotation acceleration AT.

In this example, at time point T43 where the regular shifting control is yet to be finished, the accelerator pedal position reaches zero. At this time point, the special shifting control transition condition is satisfied ex-post facto. Accordingly, at time point T43 and later, the special shifting control is exerted. In accordance with the accelerator pedal position becoming zero, the second limit oil pressure PL2 becomes greater than the stroke end pressure Pse of the release-side element. At time point T43 and later, the release-side oil pressure has its lower limit value regulated by the second limit oil pressure PL2, and the release-side element is kept in the slipping state. Specifically, from time points T43 to T44, the variation rate control is exerted. From time points T44 to T45, the rotation speed control is exerted. Subsequently, at time point T45 where the rotation speed difference ΔN2 becomes equal to or smaller than the prescribed value, the engage-side oil pressure is increased to the full engagement pressure, and the release-side oil pressure is then swiftly caused to reach zero, whereby the shifting operation ends.

Figure 16:
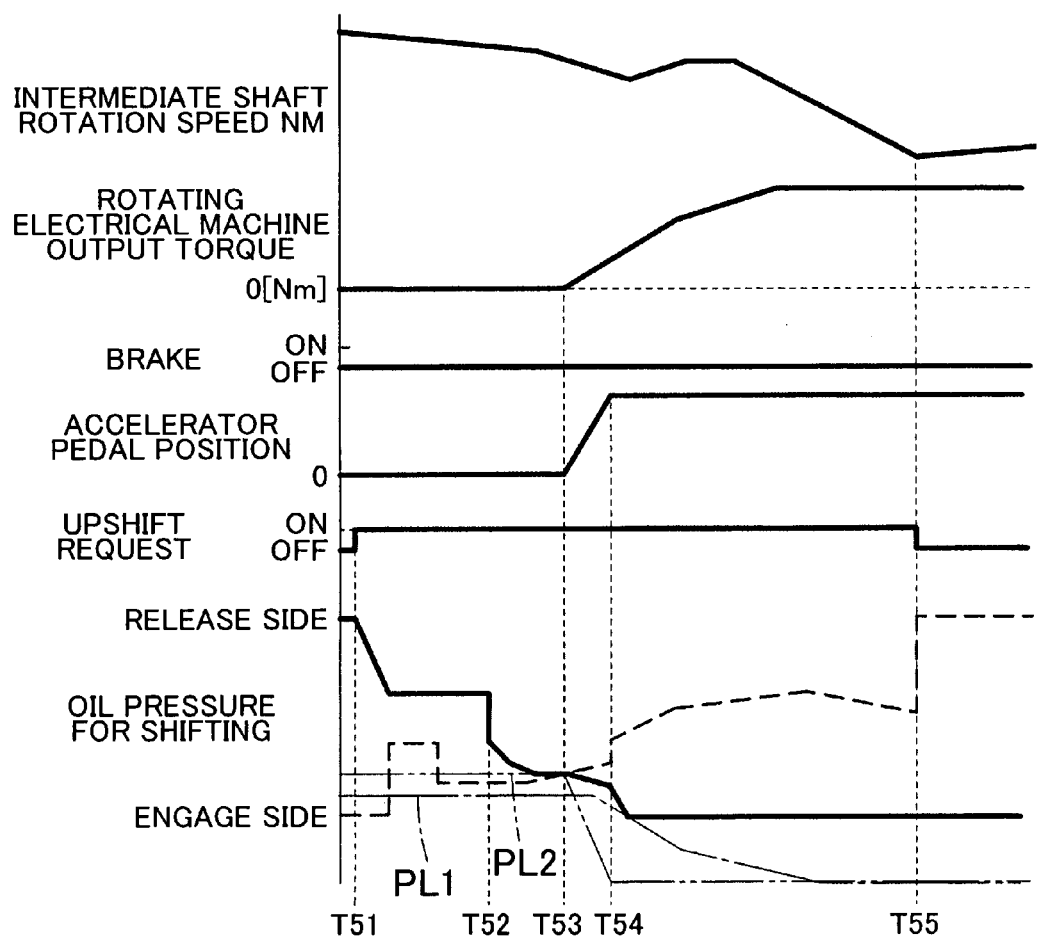
FIG. 16 is a timing diagram for describing an exemplary shifting control process according to the present embodiment.

FIG. 16 is a timing diagram showing another example in which the shifting operation is carried out under the combination of the regular shifting control and the special shifting control. FIG. 16 shows an example in which the special shifting control is initially exerted, and then the control is switched to the regular shifting control before the post-shift target shift speed is formed. In this example, the accelerator pedal position is equal to or smaller than the prescribed value, i.e., in the accelerator pedal light depression position state, and the upshift request is turned ON at time point T51. From time points T51 to T52, the release-side oil pressure is placed at the holding pressure that is commensurate with the output torque, and the engage-side oil pressure is kept at a prescribed constant pressure after the preliminary filling is completed. Subsequently, the special shifting control is exerted over the release-side oil pressure so as to keep the release-side element in the slipping state.

In this example, at time point T53 where the special shifting control is yet to be finished, the driver of the vehicle depresses the accelerator pedal. At least at time point T54 immediately after the driver's operation, the accelerator pedal position increases to become equal to or greater than the prescribed value, whereby the special shifting control transition condition is no longer satisfied ex-post facto. Hence, at time point T54 and later, the regular shifting control is exerted. Specifically, the control is exerted so as to vary the engage-side oil pressure such that the release-side oil pressure is quickly reduced, so that the release-side element is swiftly released and that the rotation speed NM of the intermediate shaft M is varied at the prescribed target rotation acceleration AT. Subsequently, at time point T55, when the rotation speed difference ΔN2 becomes equal to or smaller than the prescribed value, the engage-side oil pressure is increased to the full engagement pressure, and the shifting operation ends.

Under the special shifting control, the release-side element is not fully engaged nor released, and kept in the slipping state for the entire shifting phase TP. Accordingly, under the special shifting control according to the present invention, the switching control section 36 can control the rotation speed NM of the intermediate shaft M during a shifting operation by controlling basically solely the release-side oil pressure. The release-side element being kept in the slipping state for the entire shifting phase TP in turn retains, for the entire shifting phase TP, a state where part of the rotational driving force transferred from the wheels 16 is transferred via the release-side element to the intermediate shaft M and to the input shaft I side that is drivably connected thereto. Accordingly, even when the rotating electrical machine 12 is caused to produce relatively great negative torque in order to carry out regenerative braking, the great negative torque output from the rotating electrical machine 12 is partially compensated for by the rotational driving force transferred from the wheels 16. This suppresses a rapid variation in the rotation speed of the input shaft I. FIG. 14 shows the manner of the rotation speed NM of the intermediate shaft M moderately varying for the entire shifting phase TP. This makes it possible to suppress the occurrence of the shift shock. Further, since basically the control exerted over the release-side oil pressure can solely suppress the occurrence of the shift shock, it is not necessary to limit the magnitude of the negative torque (regenerative torque) output from the rotating electrical machine 12, in contrast to a case where the release-side element is fully released relatively swiftly at an initial stage in the shifting phase TP. Hence, without inviting any disadvantages such as a reduction in the energy to be regenerated, a high energy efficiency can be retained.

For the purpose of comparison, in FIG. 14, a dash line represents the manner of variation in the rotation speed NM of the intermediate shaft M in a case where the release-side element is swiftly released as in the regular shifting control, despite the situation where the rotating electrical machine 12 produces negative torque to carry out regeneration. In this case, it can be seen that the rotation speed NM of the intermediate shaft M is rapidly reduced and dropped to become equal to or smaller than the post-switch target rotation speed NT2 at an initial stage in the shifting phase TP. When the rotation speed NM of the intermediate shaft M rapidly varies in such a manner, a relatively great torque variation is prone to be transferred to the output shaft O, which highly possibly triggers shift shock. In contrast thereto, under the special shifting control, the rotation speed NM of the intermediate shaft M moderately varies for the entire shifting phase TP as described in the foregoing, which effectively suppresses the occurrence of the shift shock.

Further, in the present embodiment, under the special shifting control, when the first limit oil pressure PL1, which becomes greater as the output torque of the rotating electrical machine 12 becomes greater in the negative direction (i.e., as the regenerative torque becomes greater), is greater than the second limit oil pressure PL2, the release-side oil pressure is regulated to be a value that is equal to or greater than the first limit oil pressure PL1. Thus, under the special shifting control, the release-side element is kept in the slipping state for the entire shifting phase TP, and the slip amount is appropriately adjusted so as to be commensurate with the negative torque (regenerative torque) of the rotating electrical machine 12. In other words, as the regenerative torque is greater, the first limit oil pressure PL1 is caused to be greater so as to reduce the slip amount, and as the regenerative torque is smaller, the first limit oil pressure PL1 is caused to be smaller so as to increase the slip amount. Thus, by taking measures in accordance with variations in the output torque of the rotating electrical machine 12, the occurrence of the shift shock can be suppressed more surely.

Meanwhile, under the special shifting control, because the release-side element is kept in the slipping state for the entire shifting phase TP, in such a case where the regenerative braking is not carried out and the rotating electrical machine 12 does not produce any negative torque, or a case where the rotating electrical machine 12 can produce negative torque only in a relatively small magnitude, a reduction in the actual rotation speed NM of the intermediate shaft M may possibly become sluggish, which results in an unduly long shifting time relative to the target shifting time Tt. Accordingly, in the present embodiment, in synchronization with keeping the release-side element in the slipping state, the engage-side oil pressure is varied under the first engagement control such that the actual rotation acceleration AM of the intermediate shaft M follows the target rotation acceleration AT. More specifically, the engage-side oil pressure is varied with a greater variation width as the absolute value of the negative torque (regenerative torque) output from the rotating electrical machine 12 is smaller, in a manner where the engage-side oil pressure increases, stays constant, and decreases in accordance with the progress of the shifting phase TP. In this manner, a reduction in the rotation speed NM of the intermediate shaft M that is prone to be sluggish due to the release-side element being kept in the slipping state is supplemented by an increase in the engage-side oil pressure, whereby a swift shifting operation is achieved. Such an effect of the first engagement control is exhibited greater as the absolute value of the negative torque (regenerative torque) output from the rotating electrical machine 12 is smaller.

Under the variation rate control in the special shifting control, the release-side oil pressure is reduced at the variation rate that is commensurate with the magnitude of the regenerative torque output from the rotating electrical machine 12. In the present embodiment, as the regenerative torque is greater, the release-side oil pressure is reduced at a variation rate whose absolute value is smaller; and as the regenerative torque is smaller, the release-side oil pressure is reduced at a variation rate whose absolute value is greater. With the structure according to the present embodiment, the release-side oil pressure is reduced more moderately as the regenerative torque is greater, whereby the rotational driving force transferred from the wheels 16 via the release-side element to the intermediate shaft M and the input shaft I side becomes great. Thus, the great negative torque of the rotating electrical machine 12 can be appropriately supplemented thereby. Hence, any rapid variation in the rotation speed of the intermediate shaft M can appropriately be suppressed by a relatively simple process.

Further, under the rotation speed control in the special shifting control, the target rotation speed NT of the intermediate shaft M and the target rotation acceleration AT at each time point are determined based on the target shifting time Tt and the rotation speed variation width W, and the release-side oil pressure is varied such that the actual rotation acceleration AM of the intermediate shaft M follows the target rotation acceleration AT at each time point. This makes it possible to appropriately control the rotation acceleration AM (temporal variation rate of the rotation speed) of the intermediate shaft M that is strongly related to the occurrence of the shift shock. Accordingly, a rapid variation in the rotation speed of the intermediate shaft M can be suppressed more surely, whereby the occurrence of the shift shock can be suppressed more surely. Further, in the present embodiment, the target rotation speeds NT at respective time points are set such that the rotation speeds of the intermediate shaft M from the time point when the rotation speed control begins to the time point when the shifting operation completes plot a time course represented by a quadratic curve. In this case, the absolute value of the target rotation acceleration AT at each time point becomes smaller toward the end point of the shifting operation (ultimately reaches zero). In this manner, at the latter half stage in the shifting phase TP, the rotation speed NM of the intermediate shaft M can smoothly be shifted to the post-switch target rotation speed NT2. Hence, the occurrence of the shift shock can be suppressed more surely.

Other Embodiments (1) In the embodiment, the description has been given of the example in which the second limit oil pressure PL2 is set to the value that is equal to or greater than the stroke end pressure Pse of the release-side element in the accelerator pedal light depression position state where the accelerator pedal position is equal to or smaller than the prescribed value, and that becomes smaller as the accelerator pedal position becomes greater. However, embodiments of the present invention are not limited thereto. Specifically, it is preferable that the second limit oil pressure PL2 be set to a value that is equal to or greater than the stroke end pressure Pse of the release-side element at least in the accelerator pedal light depression position state. For example, one of preferable embodiments of the present invention may be a structure in which the second limit oil pressure PL2 is set to a value that is equal to or greater than the stroke end pressure Pse of the release-side element and that is a fixed value not dependent on the magnitude of the accelerator pedal position.

(2) In the embodiment, the description has been given of the example in which the first limit oil pressure PL1 is set to a value that becomes equal to the stroke end pressure Pse of the release-side element when the output torque of the rotating electrical machine 12 is zero, and that becomes greater as the output torque of the rotating electrical machine 12 becomes greater in the negative direction (i.e., as the regenerative torque becomes greater). However, embodiments of the present invention are not limited thereto. Specifically, it is preferable that the first limit oil pressure PL1 be set to a value that is equal to or greater than the stroke end pressure Pse of the release-side element at least when the rotating electrical machine 12 produces negative torque (regenerative torque). For example, one of preferable embodiments of the present invention may be a structure in which the first limit oil pressure PL1 is set to a value that is equal to or greater than the stroke end pressure Pse of the release-side element and that is a fixed value not dependent on the magnitude of the negative torque output from the rotating electrical machine 12.

(3) In the embodiment, the description has been given of the example in which both the first limit oil pressure PL1 and the second limit oil pressure PL2 are set, and greater one of these two limit oil pressures is set as the lower limit value of the release-side oil pressure. However, embodiments of the present invention are not limited thereto. Specifically, one of preferable embodiments of the present invention may be a structure in which only one of the first limit oil pressure PL1 and the second limit oil pressure PL2 is set, and the set limit oil pressure is adopted also as the lower limit value of the release-side oil pressure.

(4) In the embodiment, the description has been given of the example in which, in the release-side special shifting control, the variation rate control is exerted at an initial stage in the shifting phase TP, and when the shifting operation progresses by 50% (i.e., the degree of progress α is 0.5) to reach the switching point, the control is switched to the rotation speed control. However, embodiments of the present invention are not limited thereto. Specifically, the switching point that defines the timing of switching from the variation rate control to the rotation speed control can be set as appropriate. When setting the switching point based on the rotation speed NM of the intermediate shaft M as in the described example, the set value can be varied as appropriate within a range from 0% (α=0) to 100% (α=1). When the switching point set to 0% (α=0), the rotation speed control solely is exerted for the entire shifting phase TP. In this case, the rotation acceleration AM and the rotation speed NM of the intermediate shaft M are appropriately varied under precise control at each time point in the entire shifting phase TP so as to achieve both the suppression of the occurrence of the shift shock and the improvement in the energy efficiency. On the other hand, when the switching point set to 100% (α=1), the variation rate control solely is exerted for the entire shifting phase TP. In this case, both the suppression of the occurrence of the shift shock and the improvement in the energy efficiency can be achieved with a relatively simple control structure. It is also preferable that the switching point be set based on an elapsed time from the start of the variation rate control, or based on the level of the release-side oil pressure and the like. For example, it may be structured such that a time point when a prescribed time has elapsed from the start of the variation rate control, or another time point when the level of the release-side oil pressure reaches a prescribed value is set as the switching point, and the rotation speed control is exerted at and following the switching point.

(5) In the embodiment, the description has been given of the example in which, under the rotation speed control in the release-side special shifting control, the release-side oil pressure is varied such that the actual rotation acceleration AM of the intermediate shaft M acquired by the rotation acceleration acquiring section 34 follows the target rotation acceleration AT at each time point. However, embodiments of the present invention are not limited thereto. Specifically, one of preferable embodiments of the present invention may be a structure in which the release-side oil pressure is varied based upon the rotation speed instead of the rotation acceleration, for example, such that the actual rotation speed NM of the intermediate shaft M detected by the intermediate shaft rotation speed sensor Se2 follows the target rotation speed NT at each time point.

(6) In the embodiment, the description has been given of the example in which, under the rotation speed control in the release-side special shifting control, the target rotation speed NT at each time point is set to plot a time course represented by a quadratic curve. However, embodiments of the present invention are not limited thereto. Specifically, as one of preferable embodiments of the present invention, it may be structured such that the target rotation speed NT at each time point is set to plot a time course represented by a linear curve, a cubic or higher order curve, a hyperbola and the like, in so far as the target rotation acceleration AT at each time point plots a time course along which the absolute value thereof becomes smaller towards the end point of the shifting operation.

(7) In the embodiment, the description has been given of the example in which, under the first engagement control in the engage-side special shifting control, the engage-side oil pressure is varied with a greater variation width as the absolute value of the negative torque (regenerative torque) output from the rotating electrical machine 12 is smaller. However, embodiments of the present invention are not limited thereto. Specifically, as one of preferable embodiments of the present invention, it may be structured such that, under the first engagement control, for example, the engage-side oil pressure is controlled at a constant variation width independently of the magnitude of the negative torque (regenerative torque) output from the rotating electrical machine 12.

(8) In the embodiment, the description has been given of the example in which both the first engagement control and the second engagement control are exerted under the engage-side special shifting control. However, embodiments of the present invention are not limited thereto. Specifically, as one of preferable embodiments of the present invention, it may be structured such that the second engagement control is solely exerted, while the first engagement control is not exerted, under the engage-side special shifting control. In this case, the engage-side oil pressure is controlled to be kept at the pressure that allows the engage-side element to be swiftly engaged, by increasing the engage-side oil pressure by a prescribed magnitude for the entire shifting phase TP. It is preferable that the second engagement control follow the end of the shifting phase TP so as to cause the engage-side oil pressure to jump straight to the full engagement pressure.

(9) In the embodiment, the description has been given of the example in which the first limit oil pressure PL1, the second limit oil pressure PL2, and the variation coefficient G are determined in accordance with prescribed arguments, based on the first limit oil pressure map (part of the limit oil pressure map 45), the second limit oil pressure map (part of the limit oil pressure map 45), and the variation coefficient map 46, respectively, that are stored in the memory 41. However, embodiments of the present invention are not limited thereto. Specifically, one of preferable embodiments of the present invention may be a structure in which part of or all of the first limit oil pressure PL1, the second limit oil pressure PL2, and the variation coefficient G are determined based on prescribed arithmetic expression(s).

(10) In the embodiment, the description has been given of the example in which the speed change mechanism 14 has three shift speed stages (first, second and third speeds) differing in gear ratio. However, embodiments of the present invention are not limited thereto. Specifically, in so far as it is a stepped transmission apparatus, the number of shift speeds is not specifically limited. One of preferable embodiments of the present invention may be a structure in which the speed change mechanism 14 has two shift speeds, or has four or more shift speeds.

(11) In the embodiment, the description has been given of the example in which the vehicular driving apparatus 1 has all the input shaft I, the intermediate shaft M, and the output shaft O that are coaxially arranged, i.e., are arranged in a uniaxial structure. However, embodiments of the present invention are not limited thereto. Specifically, as one of preferable embodiments of the present invention, the present invention may be applied to the vehicular driving apparatus 1 in which the input shaft I and the intermediate shaft M are arranged on different axes from each other, for example.

The present invention can suitably be applied to a control apparatus for controlling a transmission apparatus that has: an input member drivably connected to an engine and a rotating electrical machine; an output member drivably connected to wheels; and a speed change mechanism that has a plurality of friction engagement elements that are controlled to be engaged and released so as to switch a plurality of shift speeds, and that shifts the rotation speed of the input member at a gear ratio of each shift speed so as to output the shifted speed to the output member.

The invention claimed is:

1. A control apparatus for controlling a transmission apparatus that includes: an input member that is drivably connected to an engine and a rotating electrical machine being capable of generating regenerative torque based on a deceleration request of a vehicle; an output member that is drivably connected to wheels; and a speed change mechanism that has a plurality of friction engagement elements that are controlled to be engaged and released so as to switch a plurality of shift speeds, and that shifts a rotation speed of the input member at one of gear ratios set for the shift speeds and outputs the shifted speed to the output member, wherein when the speed change mechanism switches one of the shift speeds to another one of the shift speeds that has smaller one of the gear ratios in an accelerator pedal light depression position state where an accelerator pedal position of the vehicle is equal to or smaller than a prescribed value, the control apparatus reduces a release-side oil pressure, which is a pressure of hydraulic oil on a release-side element that serves as the friction engagement element to be released among the friction engagement elements so as to cause the release-side element to slip, and keeps the release-side element in such a slipping state where transfer of a driving force is carried out while the engagement members on both sides of the release-side element have a rotation speed difference and also keeps the release-side oil pressure at a magnitude that is equal to or greater than a stroke end pressure of a piston of the release side element so that the slipping state of the release-side element can be kept for an entire shifting phase independently of an output torque from the rotating electrical machine, the entire shifting phase begins at a time point when the release-side element starts to slip and ends at another time point when a rotation speed, which is obtained by multiplying a rotation speed of the output member by the gear ratio after the switching of the shift speeds, and the rotation speed of the input member synchronize with each other.

2. The control apparatus according to claim 1, wherein
a first limit oil pressure is set to a value that is commensurate with magnitude of the output torque from the rotating electrical machine, and that is equal to or greater than the stroke end pressure of the piston of the release-side element when the output torque from the rotating electrical machine is negative, and
the release-side oil pressure is kept at magnitude equal to or greater than the first limit oil pressure for the entire shifting phase.

3. The control apparatus according to claim 2, wherein the first limit oil pressure is set to a value that becomes greater as the output torque from the rotating electrical machine varies in a negative direction.

4. The control apparatus according to claim 1, wherein
a second limit oil pressure is set to a value that is commensurate with the accelerator pedal position, and that is equal to or greater than the stroke end pressure of the piston of the release-side element in the accelerator pedal light depression position state, and
the release-side oil pressure is kept at magnitude equal to or greater than the second limit oil pressure for the entire shifting phase.

5. The control apparatus according to claim 1, wherein
a target rotation speed variation rate of the input member is determined based on a preset target shifting time that represents a target required time for switching between the shift speeds, and a rotation speed variation width that represents a difference in the rotation speed of the input member before and after the switching of the shift speeds, and
an engage-side oil pressure that is a pressure of the hydraulic oil on an engage-side element is varied in synchronization with a reduction in the release-side oil pressure, such that an actual rotation speed variation rate of the input member follows the target rotation speed variation rate.

6. The control apparatus according to claim 5, wherein
a reference oil pressure variation amount that is required for varying the rotation speed of the input member at the target rotation speed variation rate is determined based on the target rotation speed variation rate, and
the engage-side oil pressure is varied in accordance with a degree of progress of the shifting phase and the output torque from the rotating electrical machine based on the reference oil pressure variation amount.

7. The control apparatus according to claim 6, wherein
in a structure in which the engage-side oil pressure is varied using the engage-side oil pressure at a start of the shifting phase as a standard of reference, based on a prescribed variation coefficient that is preset in accordance with the degree of progress of the shifting phase and the output torque from the rotating electrical machine and based on the reference oil pressure variation amount,
the variation coefficient is set to a value that
becomes greater as the shifting phase progresses at least at a first stage among a plurality of stages set in accordance with the degree of progress of the shifting phase and becomes smaller as the shifting phase progresses at least at a final stage, and
becomes greater as the output torque from the rotating electrical machine varies in a positive direction when the output torque from the rotating electrical machine is negative.

8. The control apparatus according to claim 1, wherein
at an initial stage in the shifting phase, variation rate control is exerted to reduce the release-side oil pressure at a pressure-reducing variation rate that is commensurate with the magnitude of the output torque from the rotating electrical machine, and
after the variation rate control is exerted and at and following a prescribed switching point, rotation speed control is exerted to vary the release-side oil pressure such that the rotation speed of the input member reaches a target rotation speed at each time point after the variation rate control is exerted.

9. The control apparatus according to claim 8, wherein, under the rotation speed control, the target rotation speed at each time point in the shifting phase is set to plot a time course along which an absolute value of a temporal variation rate of the target rotation speed becomes smaller toward a terminal stage in the shifting phase.

10. The control apparatus according to claim 8, wherein, under the rotation speed control, a target rotation speed variation rate of the input member is determined based on a preset target shifting time that represents a target required time for switching between the shift speeds, and a rotation speed variation width that represents a difference in the rotation speed of the input member before and after the switching of the shift speeds, and
control is exerted to vary the release-side oil pressure such that an actual rotation speed variation rate of the input member follows the target rotation speed variation rate.

11. The control apparatus according to claim 3, wherein
a second limit oil pressure is set to a value that is commensurate with the accelerator pedal position, and that is equal to or greater than the stroke end pressure of the piston of the release-side element in the accelerator pedal light depression position state, and
the release-side oil pressure is kept at magnitude equal to or greater than the second limit oil pressure for the entire shifting phase.

12. The control apparatus according to claim 11, wherein
target rotation speed variation rate of the input member is determined based on a preset target shifting time that represents a target required time for switching between the shift speeds, and a rotation speed variation width that represents a difference in the rotation speed of the input member before and after the switching of the shift speeds, and
an engage-side oil pressure that is a pressure of the hydraulic oil on an engage-side element is varied in synchronization with a reduction in the release-side oil pressure, such that an actual rotation speed variation rate of the input member follows the target rotation speed variation rate.

13. The control apparatus according to claim 12, wherein
a reference oil pressure variation amount that is required for varying the rotation speed of the input member at the target rotation speed variation rate is determined based on the target rotation speed variation rate, and
the engage-side oil pressure is varied in accordance with a degree of progress of the shifting phase and the output torque from the rotating electrical machine based on the reference oil pressure variation amount.

14. The control apparatus according to claim 13, wherein
in a structure in which the engage-side oil pressure is varied using the engage-side oil pressure at a start of the shifting phase as a standard of reference, based on a prescribed variation coefficient that is preset in accordance with the degree of progress of the shifting phase and the output torque from the rotating electrical machine and based on the reference oil pressure variation amount,
the variation coefficient is set to a value that
becomes greater as the shifting phase progresses at least at a first stage among a plurality of stages set in accordance with the degree of progress of the shifting phase and becomes smaller as the shifting phase progresses at least at a final stage, and
becomes greater as the output torque from the rotating electrical machine varies in a positive direction when the output torque from the rotating electrical machine is negative.

15. The control apparatus according to claim 14, wherein
at an initial stage in the shifting phase, variation rate control is exerted to reduce the release-side oil pressure at a pressure-reducing variation rate that is commensurate with the magnitude of the output torque from the rotating electrical machine, and
after the variation rate control is exerted and at and following a prescribed switching point, rotation speed control is exerted to vary the release-side oil pressure such that the rotation speed of the input member reaches a target rotation speed at each time point after the variation rate control is exerted.

16. The control apparatus according to claim 15, wherein, under the rotation speed control, the target rotation speed at each time point in the shifting phase is set to plot a time course along which an absolute value of a temporal variation rate of the target rotation speed becomes smaller toward a terminal stage in the shifting phase.

17. The control apparatus according to claim 16, wherein, under the rotation speed control, a target rotation speed variation rate of the input member is determined based on a preset target shifting time that represents a target required time for switching between the shift speeds, and a rotation speed variation width that represents a difference in the rotation speed of the input member before and after the switching of the shift speeds, and
control is exerted to vary the release-side oil pressure such that an actual rotation speed variation rate of the input member follows the target rotation speed variation rate.

18. The control apparatus according to claim 2, wherein
a second limit oil pressure is set to a value that is commensurate with the accelerator pedal position, and that is equal to or greater than the stroke end pressure of the piston of the release-side element in the accelerator pedal light depression position state, and
the release-side oil pressure is kept at magnitude equal to or greater than the second limit oil pressure for the entire shifting phase.

19. The control apparatus according to claim 2, wherein
a target rotation speed variation rate of the input member is determined based on a preset target shifting time that represents a target required time for switching between the shift speeds, and a rotation speed variation width that represents a difference in the rotation speed of the input member before and after the switching of the shift speeds, and
an engage-side oil pressure that is a pressure of the hydraulic oil on an engage-side element is varied in synchronization with a reduction in the release-side oil pressure, such that an actual rotation speed variation rate of the input member follows the target rotation speed variation rate.

20. The control apparatus according to claim 3, wherein
a target rotation speed variation rate of the input member is determined based on a preset target shifting time that represents a target required time for switching between the shift speeds, and a rotation speed variation width that represents a difference in the rotation speed of the input member before and after the switching of the shift speeds, and
an engage-side oil pressure that is a pressure of the hydraulic oil on an engage-side element is varied in synchronization with a reduction in the release-side oil pressure, such that an actual rotation speed variation rate of the input member follows the target rotation speed variation rate.

* * * * *